United States Patent
Nose et al.

(10) Patent No.: US 8,663,818 B2
(45) Date of Patent: Mar. 4, 2014

(54) HIGH CORROSION RESISTANCE HOT DIP GALVANIZED STEEL MATERIAL

(75) Inventors: Koichi Nose, Futtsu (JP); Kohei Tokuda, Futtsu (JP); Yuichi Sato, Futtsu (JP); Makoto Nakazawa, Futtsu (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 1023 days.

(21) Appl. No.: 12/224,967

(22) PCT Filed: Mar. 14, 2007

(86) PCT No.: PCT/JP2007/055778
§ 371 (c)(1),
(2), (4) Date: Oct. 10, 2008

(87) PCT Pub. No.: WO2007/108496
PCT Pub. Date: Sep. 27, 2007

(65) Prior Publication Data
US 2009/0053555 A1    Feb. 26, 2009

(30) Foreign Application Priority Data

| Mar. 20, 2006 | (JP) | ................. 2006-076547 |
| Apr. 3, 2006 | (JP) | ................. 2006-102108 |
| Feb. 2, 2007 | (JP) | ................. 2007-024427 |

(51) Int. Cl.
   *B32B 15/00* (2006.01)
   *B32B 15/01* (2006.01)
(52) U.S. Cl.
   USPC ................. 428/659; 428/658; 428/681
(58) Field of Classification Search
   None
   See application file for complete search history.

(56) References Cited

U.S. PATENT DOCUMENTS

| 4,401,727 A | 8/1983 | Berke et al. |
| 2005/0279427 A1 | 12/2005 | Park et al. |

(Continued)

FOREIGN PATENT DOCUMENTS

| EP | 1158069 | 11/2001 |
| EP | 1466994 | 10/2004 |

(Continued)

OTHER PUBLICATIONS

JP 2002-180225 English Machine Translation, Takada et al. Jun. 2002.*

(Continued)

*Primary Examiner* — Gwendolyn Blackwell
*Assistant Examiner* — Lucas Wang
(74) *Attorney, Agent, or Firm* — Kenyon & Kenyon LLP

(57) ABSTRACT

The present invention provides a high corrosion resistance hot dip galvannealed steel material comprised of a Zn-based hot dip plated steel material achieving both a higher corrosion resistance of the plated layer itself by the added elements and sacrificial protection of iron metal by the plated layer or workability free of degradation caused of formation of intermetallic compounds by added elements, that is, a high corrosion resistance hot dip Zn plated steel material characterized in that an alloy plated layer containing Zn: 35 mass % or more, preferably 40 mass % or more, contains a non-equilibrium phase having a heat capacity by differential scanning calorimetry of 1 J/g or more. Furthermore, 5% or more, preferably 50% or more in terms of vol % is an amorphous phase. The alloy layer may contain, by mass %, Mg: 1 to 60% and Al: 0.07 to 59%, may further contain one or more elements selected from Cr, Mn, Fe, Co, Ni, and Cu in a total of 0.1 to 10%, and may in addition contain one or more elements of 0.1 to 10% of La, 0.1 to 10% of Ce, 0.1 to 10% of Ca, 0.1 to 10% of Sn, 0.005 to 2% of P, and 0.02 to 7% of Si.

23 Claims, 2 Drawing Sheets

(56) References Cited

U.S. PATENT DOCUMENTS

| | | | |
|---|---|---|---|
| 2006/0159858 A1* | 7/2006 | Danger et al. | 427/458 |
| 2007/0209555 A1 | 9/2007 | Yamamoto | |

FOREIGN PATENT DOCUMENTS

| | | | |
|---|---|---|---|
| EP | 1557478 | | 7/2005 |
| EP | 1624090 | * | 2/2006 |
| EP | 1629969 | | 3/2006 |
| EP | 1634932 | | 3/2006 |
| GB | 1125965 | | 9/1968 |
| JP | 58-133360 | | 8/1983 |
| JP | 59-171645 | * | 9/1984 |
| JP | 02-093053 | * | 4/1990 |
| JP | 04-032580 | * | 2/1992 |
| JP | 06-248424 | | 9/1994 |
| JP | 06-346254 | | 12/1994 |
| JP | 2000-054101 | | 2/2000 |
| JP | 2000-104154 | | 4/2000 |
| JP | 2001-234361 | | 8/2001 |
| JP | 2002-012954 | * | 1/2002 |
| JP | 2002-180225 | * | 6/2002 |
| JP | 2002-220650 | | 8/2002 |
| JP | 2003-138359 | * | 5/2003 |
| JP | 2003-268519 | | 9/2003 |
| JP | 2004-019000 | | 1/2004 |
| JP | 2004-107695 | | 4/2004 |
| JP | 2004-149914 | | 5/2004 |
| JP | 2005-060805 | | 3/2005 |
| JP | 2005-126795 | | 5/2005 |
| JP | 2005-256091 | | 9/2005 |
| JP | 2005-320556 | | 11/2005 |
| JP | 2005-336546 | | 12/2005 |
| JP | 2006-002252 | | 1/2006 |
| SU | 1 289 910 | | 2/1987 |
| WO | 2005/105934 | | 11/2005 |
| WO | 2006/002843 | | 1/2006 |
| WO | 2007/004671 | | 1/2007 |

OTHER PUBLICATIONS

JP 59-171645, English Abstract.*
JP 02-093053, English Abstract.*
JP 04-032580 English Abstract.*
International Search Report dated Apr. 24, 2007 issued in corresponding PCT Application No. PCT/JP2007/055778.
Russian Office Action in Russian Application No. 2008141267/02 dated Mar. 3, 2010.
European Search Report dated Apr. 11, 2012, issued in connection with corresponding European application No. 07739221.5.
Phaneuf et al., "Direct observation of amorphous and nanocrystalline phases in commercial galvannealed steel sheet", Scripta Metallurgica et Materialia, Oxford, GB, vol. 31, No. 1, Jul. 1, 1994, pp. 1-4, ISSN: 0956-716X.
Phaneuf et al., "Possible genesis of amorphous and nanocrystalline phases in galvannealed steel coatings", Proceedings of International Conference on Solid-Solid Phases Transformations in Inorganic Materials: Jul. 17-22, 1994—Framington, PA, USA; International Conference on Solid-to-Solid Phase Transformations in Inorganic Materials, Jan. 1, 1994, pp. 1051-1056, ISBN: 978-0-87339-278-5.
Taiwanese Office Action dated Aug. 25, 2011, issued in corresponding Taiwanese Patent Application No. 096109323.
Stavros, "Hot Dip Coatings", ASM Handbook. vol. 13 Corrosion. ASM International USA, 1987. pp. 432-445.
Leonard, "Continuous Hot Dip Coatings" ASM Handbook vol. 13A Corrosion: Fundamentals, Testing, and Protection 2003. pp. 786-793.
Chen, "Morphology and Kinetics of Interfacial Layer Formation during Continuous Hot-Dip Galvanizing and Galvannealing," Metallurgical and Materials Transactions A, vol. 39A, Sep. 2008, pp. 2128-2142.
Production Techniques of Amorphous Alloys; Akihisa Inoue, Materia vol. 35, 3(1996), pp. 244-249.
Paulitch, "Low Friction crN/TiN multilayer coatings prepared by a hybrid high power impulse magnetron sputtering/DC magnetron sputtering deposition technique," Thin Solid Film 518 (2010) 5553-5557.
Kimura, "Thermal conductivities of yttria-stablized zirconia films measured by a laser-heating AC method," Surface & Coatings Technology 198 (2005) 129-132.
The Making, Shaping and Treating of Steel(l0th Ed.), United States Steel Company; Chapter XXV, Part III-Galvanizing, Line 18 on p. 937 and Fig 417 on p. 940.
Schultz, "Formation of Amorphous Metals by Mechanical Alloying," Materials Science and Engineering, 97(1988) pp. 15-23.
Office Action cited on May 31, 2011 in the corresponding Japanese application No. 2008-506327.

* cited by examiner

HIGH CORROSION RESISTANCE HOT DIP GALVANIZED STEEL MATERIAL

TECHNICAL FIELD

The present invention relates to a high corrosion resistance surface treated steel material, more particularly relates to a high corrosion resistance hot dip galvanized steel material.

BACKGROUND ART

Galvanized steel is used in a wide range of fields such as automobiles, household electrical appliances, building materials, and the like, but from the object of ensuring a long term rust prevention effect, generally plating of a high deposition weight is effective. This is because galvanization itself slows the corrosion rate in a steel material, in addition, zinc, whose corrosion potential is low, has a sacrificial protection in regards to the steel material at places where the iron metal is exposed, and the anti-corrosion effect due to these is obtained by the consumption of zinc, so the greater the amount of zinc per unit area, the longer the effect can be maintained. Recently, it has been learned that the corrosion products of zinc themselves also have the effect of suppressing the corrosion of the plated layer and iron metal, but this effect is also related to the absolute amount of the zinc, so again a greater amount of zinc is desired. On the other hand, if the amount of zinc deposition becomes great, the workability, weldability, and other required characteristics of the steel material tend to degrade. If possible, use of a lower amount of deposition to obtain a high corrosion resistance is desired.

To impart a sufficient corrosion resistance by a lower amount of deposition of plating, many attempts have been made to raise the corrosion resistance of galvanization by adding alloy elements. In actuality, Zn—Ni alloy platings, Zn—Fe alloy platings, and the like are being widely used mainly for automobile steel sheets, while Zn—Al alloy platings are being widely used mainly for building materials. In particular, in Zn—Al alloy platings, plated layers given Mg or Si to further improve corrosion resistance have been developed.

However, if using the addition of alloy components to improve the corrosion resistance of the plated layer, depending on the combination of the type of the alloy components and corrosion environment, the plated layer is sometimes ends up becoming passivated. As described above, in corrosion resistance in a galvanized steel material, both the small corrosion rate of the plated layer itself and the function of sacrificial protection of the sacrificial dissolution of the plated layer protecting the iron metal when the iron metal is exposed are important. If the plated layer is passivated, while the corrosion rate of the plated layer itself becomes extremely small, the function of the sacrificial protection ends up being lost or even conversely the phenomenon arises of the corrosion of the iron metal ending up being promoted if the iron metal is exposed.

Not much has been disclosed in patent documents up until now about the method of obtaining both the contradictory functions of higher corrosion resistance of the plated layer itself and securing sacrificial protection when the iron metal is exposed.

For example, Japanese Patent Publication (A) No. 6-248424 discloses the idea relating to Zn—Mg alloy plating of giving a gradient to the distribution of concentration of the alloy components in the plated layer in the thickness direction to secure high corrosion resistance at the surface layer and sacrificial protection near the iron metal. This idea would be excellent if it could be attained by an inexpensive method, but to give a gradient to the components in the thickness direction of the plated layer, vapor deposition plating or other relatively expensive, poor productivity methods have to be employed. Use of the superior productivity hot dip plating to give a gradient to the components in the thickness direction of the alloy plating is very difficult. Gradient components plating by alloying with the iron metal such as with hot dip galvannealing is possible, but what can be controlled by alloying with iron metal is basically the ratio of the Fe element and the other plating components, so the obtainable corrosion resistance remains in the range of the plating components mostly containing Fe, and a sufficient high corrosion resistance cannot be hoped for.

Further, Japanese Patent Publication (A) No. 6-346254 discloses a method of using a multi-layered plating structure comprised of a base metal plated with Zn by vapor deposition and further plated by Cr by vapor deposition so as to reduce the corrosion rate of Zn and maintain the sacrificial protection for a long time. This is also a method of vapor deposition plating.

Japanese Patent Publication (A) No. 2001-234361 discloses, while not galvanization, a method of Ni—Au multi-layered plating suppressing corrosion of the underlying Ni layer by high corrosion resistance Au by providing the underlying Ni layer with a precious Ni layer at the bottom and a base Ni layer at the top and using the sacrificial protection function of the top base Ni layer to improve the overall corrosion resistance. Applying this idea to hot dip galvannealing would again require a multi-layered structure, so a large rise in production costs cannot be avoided.

The technologies disclosed in said Japanese Patent Publication (A) No. 6-346254 and Japanese Patent Publication (A) No. 2001-234361 are both ideas of separation of the functions of corrosion resistance and sacrificial protection by multi-layered platings having layered structures. The technology disclosed in Japanese Patent Publication (A) No. 6-248424 can be said to be a similar idea in the point of separation of functions between the top layer part and the bottom layer part. That is, up to now, the only idea has been the separation of the two contradictory functions among several layers.

Furthermore, one of the problems that occurs when improving the corrosion resistance of the plated layer by the addition of alloy components is the defect that the alloy plating is generally poor in workability. In particular, the greater the number of types of elements added, such as a third element or fourth elements, the easier the formation of poor ductility intermetallic compounds or supersaturated solutes etc. the poorer the workability tends to become.

Further, component elements added for improving the corrosion resistance also form intermetallic compounds of different compositions or cause precipitation of intermetallic compounds of different compositions from the matrix in the matrix of the solutes. In that state, a pair of intermetallic compounds with the different composition or a pair of the matrix and an intermetallic compounds forms electrochemical coupling cells of corrosion whereby conversely corrosion sometimes ends up being promoted.

To deal with the negative effects caused by the formation of these intermetallic compounds etc., if it were possible to make the metal structure of the alloy plating amorphous, no intermetallic compounds would be formed, so the negative effects could be eliminated and it would be possible to realize an alloy plated steel sheet with high corrosion resistance and excellent workability.

However, usually, to produce amorphous metal, there is a large problem that the cooling rate required for the formation of an amorphous structure is extremely large.

For example, Japanese Patent Publication (A) No. 2005-126795 discloses a method of forming an amorphous covering comprising flame spraying a metal powder having Mg and Zn as chemical components on a base material so give a cooling rate of 100,000° C./sec or more.

In this way, in a usual amorphous alloy, when solidifying from a molten state, a large cooling rate is necessary. In the conventional hot dip plating the cooling rate in the temperature range when solidifying from the molten state of plating is said to be 100° C./sec or less, formation of an amorphous structure in the plating state is not possible. With the method of production of flame spraying, it is difficult to inexpensively mass produce a uniform material.

Japanese Patent Publication (A) No. 2005-60805 discloses a film-like alloy member containing an amorphous phase formed by making amorphous alloy particles, comprised of an alloy system of an Fe, Co, and Ni-based alloy, but able to include Zn up to 20 at % as a selectively added element and having an amorphous phase in terms of volume percent of 50% or more, strike a substrate at a high speed. This method is also a method of producing amorphous alloy particles and formation of a film on a substrate having inefficiencies similar to flame spraying and cannot be said to be a method suited for inexpensive mass production.

Regarding the issue of the cooling rate, in recent years alloy compositions able to be made amorphous even with a small cooling rate have been discovered and energetically researched. Such an alloy that can be made amorphous even if solidified at a small cooling rate can be made amorphous even if an alloy of a relatively large size since the cooling rate is small, so is called "bulk amorphous". If the cooling rate required for formation of an amorphous structure becomes sufficiently small and an amorphous alloy could be formed by a cooling rate able to be realized by a conventional hot dip plating process or less, there would be the possibility of amorphous plating by hot dip plating.

However, up until now, the only reported examples of alloy systems forming bulk amorphous structures have been based on Zr, Mg, Fe, Pd, Co, Ca, and other limited elements. There have been no examples of Zn-based alloys.

There have been some examples of Zn as an element selectively added to a bulk amorphous structure based on other elements. For example, as in Japanese Patent Publication (A) No. 2006-2252, an Mg-based bulk amorphous alloy containing Zn as a selective element in an amount of up to 30 at % and, as in Japanese Patent Publication (A) No. 2004-149914, a Zr/Hf-based bulk amorphous alloy containing Zn as a selective element in an amount of 5 to 15 at % have been disclosed.

However, there is no example of a bulk amorphous alloy containing Zn, required for corrosion resistance of a hot dip plated steel sheet, as its main component. Further, there is no example of a combination of elements considering the performance and productivity of hot dip plated steel sheet. Consequently, there are no reported examples or examples of patents of amorphous Zn-based hot dip plated steel sheet.

DISCLOSURE OF THE INVENTION

The present invention has as its object the provision of a high corrosion resistance hot dip galvanized steel material achieving both a higher corrosion resistance of the plated layer itself sacrificial protection performance of the iron metal by the plated layer or workability free from degradation caused by formation of intermetallic compounds by added elements.

The present inventors researched the higher corrosion resistance of a hot dip galvannealed steel material and in the process studied methods for achieving both the higher corrosion resistance of a plated layer itself by elements added to the plated layer and the sacrificial protection performance protecting the iron metal by plating and discovered that in a certain specific system of components, when the cooling rate at the time of plating solidification is somewhat high, a plating tending to achieve both of these can be realized. Furthermore, they ran experiments changing the chemical components and solidification cooling and investigated the physical properties of platings correlated with the solution of the problem and as a result discovered that it is possible to realize both a higher corrosion resistance of the plated layer itself and a sacrificial protection performance protecting the iron metal in a plating maintaining non-equilibrium phase parts in the plating.

Further, the present inventors conducted various studies on the method of suppressing degradation of the workability and corrosion resistance due to intermetallic compounds through the elements added to the plated layer of a hot dip galvanized steel material and discovered a method of solution by making the plated layer amorphous. Further, they studied systems of chemical components improving the ability to form an amorphous structure containing mainly Zn and not containing elements having a negative effect on the corrosion resistance and workability by just adding elements effective for corrosion resistance or elements not having a negative effect and finally discovered that it is possible to realize a high corrosion resistance hot dip galvanized steel material able to be produced by the conventional hot dip plating process or just making some improvements to the conventional hot dip plating process.

The present invention was made based on the above discoveries and has as its gist the following:

(1) A high corrosion resistance hot dip galvannealed steel material characterized by having an alloy plated layer containing Zn in an amount of 35 mass % or more and in that said alloy plated layer contains a non-equilibrium phase with a heat capacity by differential scanning calorimetry of 1 J/g or more.

(2) A high corrosion resistance hot dip galvannealed steel material characterized by having an alloy plated layer comprising Zn in an amount of 35 mass % or more and in that said alloy plated layer contains a non-equilibrium phase with a heat capacity by differential scanning calorimetry of a rate of temperature rise of 0.5° C./sec of 1 J/g or more.

(3) A high corrosion resistance hot dip galvannealed steel material according to (1) or (2) wherein said Zn is 40 mass % or more.

(4) A high corrosion resistance hot dip galvannealed steel material according to any one of (1) to (3) wherein said alloy plated layer contains, by mass %, Mg: 1 to 60% and Al: 0.07 to 59%.

(5) A high corrosion resistance hot dip galvannealed steel material according to (4) wherein said alloy plated layer contains, by mass %, Zn: 40% or more, Mg: 1 to 45%, and Al: 0.07 to 59%.

(6) A high corrosion resistance hot dip galvannealed steel material according to (4) or (5) wherein the contents of Mg and Al in said alloy plated layer satisfy the relationships of the following (Formula 1) to (Formula 5):

$$40 \leq Zn\% \leq 94.3 \tag{Formula 1}$$

$$0.08 \leq Al\% \leq 20 \tag{Formula 2}$$

$$3 \leq Mg\% \leq 18 \tag{Formula 3}$$

$$Al\% \leq 2 \times Mg\% \tag{Formula 4}$$

$$Al\% \geq 1.24 \times Mg\% - 12.32 \tag{Formula 5}$$

(wherein the element name % is the content by mass % of the element)

(7) A high corrosion resistance hot dip galvannealed steel material according to any one of (1) to (6) further containing as components in said alloy plated layer, by mass %, one or more elements selected from among Cr, Mn, Fe, Co, Ni, and Cu in a total of 0.1 to 10%.

(8) A high corrosion resistance hot dip galvannealed steel material according to any one of (1) to (7) further containing as components in said alloy plated layer, by mass %, one or more elements selected from Bi, Mo, W, and Y in a total of 0.1 to 10%.

(9) A high corrosion resistance hot dip galvannealed steel material according to any one of (1) to (8) further containing in said alloy plated layer, by mass %, one or more of La: 0.1 to 10%, Ce: 0.1 to 10%, Ca: 0.1% to 10%, Sn: 0.1% to 10%, P: 0.005% to 2%, and Si: 0.02% to 7%.

(10) A high corrosion resistance hot dip galvannealed steel material according to (1) or (2) wherein said alloy plated layer contains an amorphous phase in a vol % of 5% or more.

(11) A high corrosion resistance hot dip galvannealed steel material according to (10) wherein said alloy plated layer contains Al and Mg and the contents of Zn, Al, and Mg satisfy the relationships of the following (Formula 6) to (Formula 8):

$$35 \leq Zn\% \leq 75 \quad \text{(Formula 6)}$$

$$0.08 \leq Al\% \leq 25 \quad \text{(Formula 7)}$$

$$22 \leq Mg\% \leq 60 \quad \text{(Formula 8)}$$

(wherein the element name % is the content by mass % of the element)

(12) A high corrosion resistance hot dip galvannealed steel material according to (10) or (11) wherein said alloy plated layer contains, by mass %, one or more of Ca, Y, and La in a total of 0.1 to 10%.

(13) A high corrosion resistance hot dip galvannealed steel material according to any one of (10) to (12) wherein a content of Al in said alloy plated layer is 14 mass % or less.

(14) A high corrosion resistance hot dip galvannealed steel material according to either (1) or (2) characterized in that 50% or more in vol % in said alloy plated layer is an amorphous phase.

(15) A high corrosion resistance hot dip galvannealed steel material according to (14) wherein said alloy plated layer contains, by mass %, Zn: 35 to 60%, Mg: 25 to 60%, Ca: 1 to 10%, and Al: 0.07 to 25% and has a balance of unavoidable impurities.

(16) A high corrosion resistance hot dip galvannealed steel material characterized by having an alloy plated layer containing Zn in an amount of 40 mass % or more and in that 50% or more in vol % in said alloy plated layer is an amorphous phase.

(17) A high corrosion resistance hot dip galvannealed steel material according to (16) wherein said alloy plated layer contains, by mass %, Mg: 1 to 55%, Ca: 1 to 45%, and Al: 0.07 to 45%, has a total of contents of Mg and Ca of no less than 5%, and has a balance of unavoidable impurities.

(18) A high corrosion resistance hot dip galvannealed steel material according to (16) wherein said alloy plated layer contains, by mass %, Mg: 1 to 25%, Ca: 1 to 10%, and Al: 0.07 to 25%, has a total of contents of Mg and Ca of 5% or more, and has a balance of unavoidable impurities.

(19) A high corrosion resistance hot dip galvannealed steel material according to (16) wherein said alloy plated layer contains, by mass %, Zn: 40 to 60%, Mg: 34 to 55%, Ca: 1 to 10%, and Al: 0.07 to 25% and has a balance of unavoidable impurities.

(20) A high corrosion resistance hot dip galvannealed steel material according to any one of (14) to (19) further containing as components in said alloy plated layer one or more elements selected from Cr, Mn, Fe, Co, Ni, and Cu in a total of 0.1 to 10 mass %.

(21) A high corrosion resistance hot dip galvannealed steel material according to any one of (14) to (20) further containing as components in said alloy plated layer one or more elements selected from Bi, Mo, W, Si, Ti, V, Ag, and Y in a total of 0.1 to 10 mass %.

(22) A high corrosion resistance hot dip galvannealed steel material according to any one of the (14) to (21) further containing, by mass %, as components in said alloy plated layer one or more elements selected from La: 0.1 to 10%, Sn: 0.1 to 10%, and P: 0.005 to 2%.

(23) A high corrosion resistance hot dip galvannealed steel material according to any one of (1) to (22) containing said alloy plated layer at least at part of the surface of the steel material.

BEST MODE FOR CARRYING OUT THE INVENTION

Figure 1:
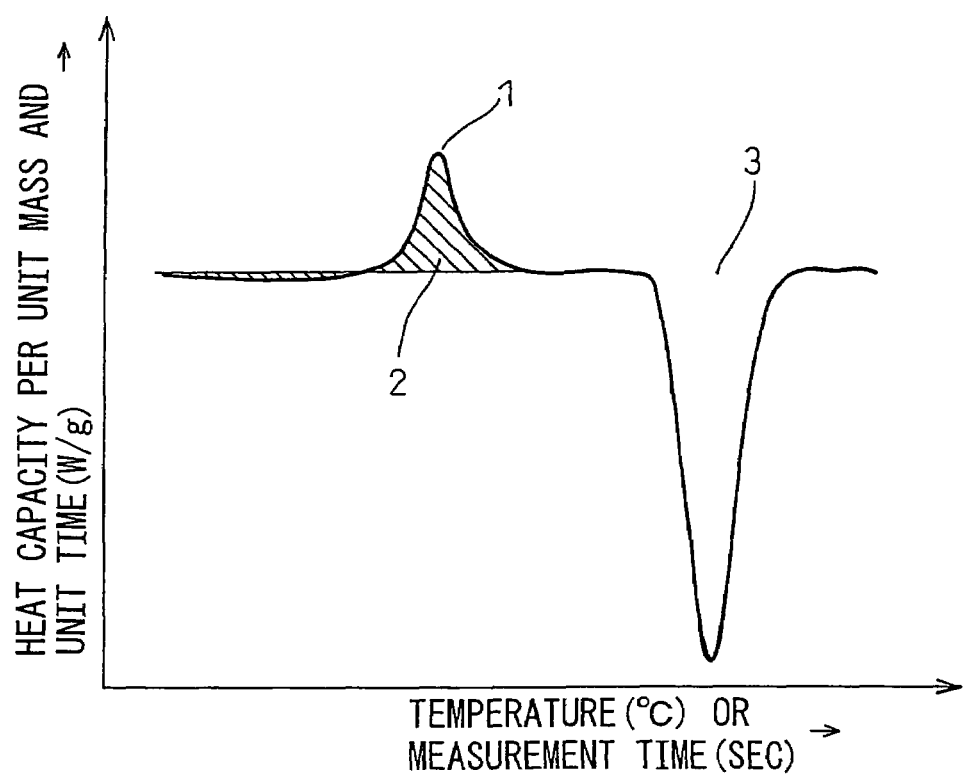
FIG. 1 is a view showing the area for calculating the DSC peak and heat capacity due to the non-equilibrium phase.

Below, the present invention will be explained in detail.

The present inventors discovered, in the above way, that both the higher corrosion resistance of the plated layer itself and sacrificial protection performance protecting the iron metal in plating holding a non-equilibrium phase in the plating. In particular, it was learned that the higher the degree of the non-equilibrium or the greater the ratio of the non-equilibrium phase, the more improved the sacrificial protection performance protecting the iron metal while maintaining the high corrosion resistance of the plated layer itself by the alloy components. Furthermore, it was learned that the contribution of the non-equilibrium phase to the sacrificial protection performance can be analyzed by the total heat capacity of the exothermic peak due to the non-equilibrium phase of the plating alloy occurring in differential scanning calorimetry (DSC) at the time of raising the temperature of the plating.

The presence of a non-equilibrium phase is detected by measuring the exothermic reaction by rising temperature DSC measurement up to the melting point or less. The non-equilibrium phase is a metastable phase, so becomes a higher energy state than the stabler equilibrium phase. At the time of transition to the equilibrium phase, the energy difference of the equilibrium phase and the non-equilibrium phase is released as generated heat. On the other hand, the phase transformation between equilibrium phases from a low temperature equilibrium phase to a high temperature equilibrium phase, melting, or other phenomena are detected as endothermic reactions in DSC. However, an oxidation reaction, similar to transformation from the non-equilibrium phase to the equilibrium phase, becomes a heat releasing reaction, so it is necessary to raise the temperature in an inert gas atmosphere in order to prevent an oxidation reaction during the measurement. Further, if measuring the thermogravimetric analysis (TG) value with DSC simultaneously or in parallel and there is no change in mass at the temperature where the exothermic reaction of the DSC occurs, it can be identified as heat generation due to the non-equilibrium phase, if an increase in mass is seen, it can be identified as heat generation due to an oxidation reaction. If there is a decrease in mass, while there is the possibility of oxidative decomposition, with the alloy of the scope of the present invention, no oxidative decomposition reaction occurs.

If the same amount of non-equilibrium phase, the greater the non-equilibrium degree, the greater the heat capacity. If the same non-equilibrium phase, the higher the vol % of the non-equilibrium phase in the total, the higher the heat capacity, so the two are expressed together by the DSC heat capacity at the time of a rise of temperature.

The exothermic reaction is measured by DSC measurement as the exothermic peak. If integrating the area of the peak, the heat capacity can be quantitatively calculated.

If explaining the method of calculation in more detail, the amount of heat per unit of mass and unit of time measured by DSC is designated as W0(t) (unit: W/g). t is the time (unit: seconds). Even with a graph of the temperature T (unit: ° C.) and W0(T), conversion is possible by t=T/V by the rate of temperature rise V during measurement (unit: ° C./sec). If estimating the amount of heat WBG(t) (unit: W/g) forming the background from the straight part before and after the exothermic peak and integrating W0(t)-WBG(t) in the region including the exothermic peak, the heat capacity ΔH (unit: J/g) can be calculated from the exothermic peak. The above calculation is expressed by a numerical formula (Formula 9):

$$\Delta H = \int_t (W0(t) - WBG(t))dt \quad \text{(Formula 9)}$$

However, the peak of the DSC in the method of detection of the non-equilibrium phase according to the present invention, as a single peak, is a peak with a half value in temperature units of 30° C. or less and a half value in measurement time units of 60 seconds or less in DSC measurement of 0.5° C./sec of 60 seconds or less. Depending on the measurement equipment or the state of the sample, sometimes the value of DSC changes by gentle undulation by the background level. If using this as the peak and integrating it over a long time or broad temperature range, sometimes the result becomes a large heat capacity in the calculation. In this way, the apparent heat capacity calculated in a wide integration range differs from the heat generation due to the non-equilibrium phase of the gist of the present invention, so is excluded.

Further, when there are a number of exothermic peaks with half values of 30° C. or less, the total of their integrated values is used as the heat capacity. When an amorphous layer is formed etc., in the process of crystallization, sometimes peaks corresponding to structural relaxation of the amorphous phase, crystal nucleation, crystal grain growth, and the like separate. When viewing the composite peak, the overall composite peak is integrated. In a composite peak, the overall half value sometimes exceed 30° C. in temperature units, but with a composite peak becoming greater in width by the combination of peaks with originally small half values, the centers of the different peaks are separated from each other to a certain extent, so a plurality of inflexion points occur within the composite peak and a plurality of extremal peaks appear in a bump like manner. Quantitatively speaking, in a curve plotting the amount of change of the DSC value per 60 seconds with respect to time or temperature, that is, in a curve of the DSC value differentiated by time (DDSC), changes in the DDSC of two times or more the noise level of the DDSC are recognized in the composite peak. As opposed to this, with changes in the background level having a gentle undulation, only undulations of the curve buried in the noise level are observed.

Further, when an endothermic peak is detected once due to melting or usually phase transformation between equilibrium phases, the exothermic peak detected in the temperature range above that is a signal relating to the phenomenon clearly unrelated to the non-equilibrium phase according to the present invention, so is not used for calculation according to the present invention.

FIG. 1 schematically shows a graph of the DSC data and the part for calculating the heat capacity. In FIG. 1, 1 shows the exothermic peak due to the non-equilibrium phase, 2 shows the area for finding the heat capacity from the exothermic peak due to the non-equilibrium phase, and 3 shows the endothermic peak of the melting point.

This calculation can be automatically performed by the recent commercially available DSC measurement apparatuses provided with computers, for example, by the EXSTAR 6000 Series made by a SII NanoTechnology Inc. etc., just by designating the boundaries around the data region including the peak desired to be calculated.

Specifically, in plating containing a non-equilibrium phase with a heat capacity of 1 J/g or more by a DSC with a rate of temperature rise of 0.5° C./sec, the inventors discovered that a sufficient sacrificial corrosion prevention performance is obtain while maintaining the higher corrosion resistance of the plated layer itself, that is, the two can be simultaneously achieved. The corrosion resistance of the plated layer itself is almost completely unaffected by the heat capacity (DSC heat capacity) due to the non-equilibrium phase, but the sacrificial protection property becomes higher due to the DSC heat capacity, so a plating having a DSC heat capacity of 2 J/g or more is preferable.

Even in commercially available plated steel sheet, with alloy plating including two or more types of components, there is plating including a small amount of a non-equilibrium phase. For example, 55 mass % Al—Zn-1.5 mass % Si plated steel sheet contains supersaturated solutes as produced, so can be said to be a type of non-equilibrium phase plating, but the degree of non-equilibrium is, in terms of DSC heat capacity, of a level of 0.1 J/g or less. In addition, in the range of commercially available hot dip plated steel sheet which the inventors could procure, even with plating including some non-equilibrium phase, it was 0.1 J/g or so at most in terms of DSC heat capacity. There was no hot dip plating with one close to 1 J/g.

If there is no idea of raising the non-equilibrium, the reason for increasing the cooling rate is to raise the production rate, refine the grains of the plated layer, heat treatment for improving the properties of the steel sheet substrate, etc. The cooling rate required for these is at most increased to $10^{2}$° C./sec or so. With the range of components of conventional hot dip plating, it probably would not have been possible to produce plating with a sufficiently high non-equilibrium.

In plating including a non-equilibrium phase, the reason why a sacrificial protection performance can be obtained has not yet been elucidated, but this is thermally unstable in the non-equilibrium phase compared to the equilibrium phase. In the same way, in electrochemical dissolution behavior as well, the dissolution is easier than in the equilibrium phase. Because of that, even with alloy components exhibiting a passive high corrosion resistance, a slight dissolution occurs partially in the non-equilibrium phase. There is the possibility that a sufficiently low corrosion potential can be maintained for sacrificial protection without causing the overall corrosion rate to rise much at all. However, future detailed research is required to elucidate the accurate mechanism of expression.

Note that for the DSC measurement of the plating alloy deposited on a plated steel material, the plated layer is mechanically shaved off to obtain a sample. At that time, shavings of the steel material of the iron metal unavoidably included can be removed by a magnet. Further, if considering working generating heat in the sample, that heat may cause a change from the non-equilibrium phase to the equilibrium phase, so caution is required. Specifically, when continuously grinding by end milling etc., it is preferable to obtain the sample while cooling with kerosene or another nonaqueous solvent not chemically reacting with the plating metal. If an amount of heat of the extent when shaving off the layer by manual work using a knife, chisel, or the like, there is no influence on the state of the alloy and cooling is not required.

Even with a plated layer which includes a large amount of non-equilibrium phase, if the concentration of Zn is less than 35 mass %, the effect of suppression of corrosion of the plated layer or iron metal by the corrosion products of zinc becomes remarkably small, so from the viewpoint of general corrosion resistance, the concentration of Zn is required to be 35 mass % or more. Further, if the concentration of Zn is less than 40 mass %, it becomes difficult for the Zn alone to secure a sufficient sacrificial protection performance, so the concentration of Zn is more preferably 40 mass % or more.

Further, as the alloy elements added in order to obtain the plated layer of a high corrosion resistance, Mg and Al are preferable. Both Mg and Al improve the corrosion resistance of the Zn-based alloy plated layer itself and stabilizes the Zn-based corrosion product having a high ability to protect the underlying steel sheet even after corrosion of the plated layer, that is, the basic zinc chloride, to contribute to further improvement of the corrosion resistance. The addition of Mg has an effect on the formation of the non-equilibrium phase as well.

When Mg is less than 1 mass %, the effect on the formation of the non-equilibrium phase is insufficient. If over 60 mass %, it becomes too active and the corrosion resistance of the plated layer itself conversely deteriorates. Even when 60 mass % or less, if the amount of Mg is over 45 mass %, there is no effect of improvement of the corrosion resistance commensurate with the increase in the amount added. The dross due to Mg tends to increase. From the viewpoint of maintenance of the plating bath and the like, 45 mass % or less is more preferable.

Al is added from the viewpoint of securing the adhesion of the plated layer. If less than 0.07 mass %, the effect is small, so adding 0.07 mass % or more is preferable. The corrosion resistance of the plated layer itself is improved when the Al is higher, but if over 59 mass %, the balance with Zn and Mg breaks down, so this is not preferable. More preferably, 45 mass % or less enables the sacrificial protection property to be secured even with a small non-equilibrium phase, so this is preferable.

In order to produce plating sufficiently containing a non-equilibrium phase, the required cooling rate differs depending on the alloy components. Conversely, if it were possible to give an extremely large cooling rate, it would be possible to produce an alloy plated layer of the steel material of the present invention without selecting the alloy components much at all.

From the viewpoint of the hot dip plating production process, a plating composition forming a non-equilibrium phase by as slow cooling as possible is preferable. Even if considering cooling by immersion in water or installing a gas cooling facility using supercooled gas, it is preferable that the non-equilibrium phase can be generated by a cooling rate of less than $10^{4\circ}$ C./sec. If considering the stability of the facilities and economics, it would be more preferable if formation were possible at $10^{3\circ}$ C./sec or less. Most preferable would be if formation were possible at $10^{2\circ}$ C./sec or less. If so, production would be possible without changing the conventional production process much at all.

On the other hand, from the viewpoint of expanding the degrees of freedom of the plating components, it would be effective to improve the cooling rate of the process. Preferably, a process giving a cooling rate of $10^{2\circ}$ C./sec or more is desirable. One giving a cooling rate of $10^{3\circ}$ C./sec or more is more desirable. If a cooling rate of $10^{4\circ}$ C./sec or more could be obtained, it would be more desirable.

However, in actuality, the cooling rate which the plated layer undergoes in the solidification process changes not just depending on the cooling method, but also the thickness of the steel material cooled or the plating thickness.

That is, in general, the cooling of the plating robs heat from the outer surface, so the closer to the surface, the larger the cooling rate becomes. Consequently, the cooling rate of the plated layer differs from the average cooling rate of the steel material. For this reason, even if cooling alloy plated layers with the same ability of formation of the non-equilibrium phase by the same cooling method, the ratio of the non-equilibrium phase in the alloy plated layer changes depending on the thickness of the plating. That is, the closer to the surface layer, the larger the cooling rate, so the easier the formation of the non-equilibrium phase. The thinner the plating, the higher the ratio of the surface layer, so the higher the ratio of the non-equilibrium phase. Even with a thick plating, the ratio of the surface layer is relatively low, so the ratio of the non-equilibrium phase also becomes small.

Even in the plated steel material of the present invention, with a plating of an alloy composition where a non-equilibrium phase is somewhat difficult to form, in order to obtain a non-equilibrium phase with a heat capacity of 1 J/g or more by DSC, it is necessary to make the plating thickness extremely small with the usual cooling method. On the other hand, even with such a plating of an alloy composition where a non-equilibrium phase is somewhat difficult to form, for example, if cooling by a super low temperature gas of $-150°$ C. using the gas immediately after evaporation of liquid nitrogen, it is sometimes possible to obtain a non-equilibrium phase with a heat capacity of 1 J/g or more by DSC even if the plating thickness becomes greater.

When producing the plated steel material of the present invention by hot-dip plating giving a greater plating thickness, at the least, water cooling is necessary. Depending on the ingredients, special cooling such as immersion in liquid nitrogen is required.

From the above discussion of the cooling rate and plating thickness, in order to be enable production of a plated steel material the present invention by a more inexpensive method and sufficient plating thickness, it is necessary to select an alloy of a specific range of chemical components where a non-equilibrium phase is easy to form. In particular, the present inventors studied a Zn—Al—Mg system under note by them as a high corrosion resistance plating and as a result discovered that in the following range of components, it is possible to produce (a plated steel material having a sufficient non-equilibrium phase by a comparatively inexpensive method:

The alloy components are expressed by a range of composition satisfying all of the five formulas:

$$40 \leq Zn\% \leq 94.3 \quad \text{(Formula 1)}$$

$$0.08 \leq Al\% \leq 20 \quad \text{(Formula 2)}$$

$$3 \leq Mg\% \leq 18 \quad \text{(Formula 3)}$$

$$Al\% \leq 2 \times Mg\% \quad \text{(Formula 4)}$$

$$Al\% \geq 1.24 \times Mg\% - 12.32 \quad \text{(Formula 5)}$$

Figure 2:
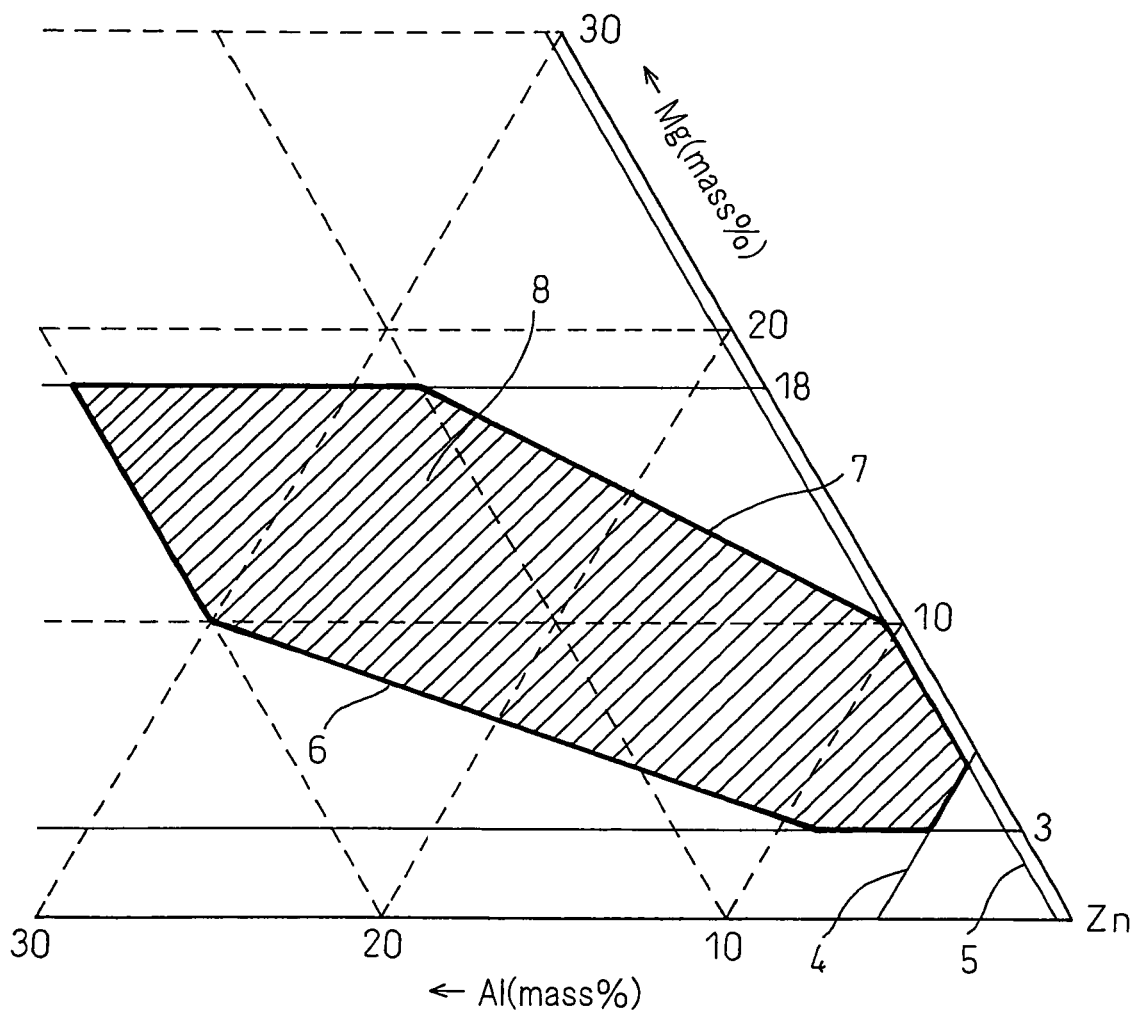
FIG. 2 is a view illustrating the range of composition of claim 5 for the case of a Zn—Mg—Al three-way system.

(wherein the element name % is the content by mass % of the element). The range of composition for the simple ternary system of components of Zn—Al—Mg is illustrated in FIG. 2. The inside of the hatched polygon of FIG. 2 is that range of components. In FIG. 2, 4 is a (Zn mass %)=94.3 line, 5 is an (Al mass %)=0.08 line, 6 is an (Al mass %)=2×(Mg mass %) line, 7 is an (Al mass %)=1.24×(Mg mass %)–12.32 line, and 8 is the range of composition of claim 5 (in case of the Zn—Mg—Al ternary system). The reason why a non-equilibrium phase is easily formed in this range in a ternary system of Zn—Al—Mg is not necessarily clear, but the possibility may be considered that the non-equilibrium phase is easily formed as a result of competition of formation of a stable by the stable composition of intermetallic compounds and a eutectic by the eutectic composition in the intermediate region of composition of the two.

The alloy plated layer of the plated steel material of the present invention may contain as added elements one or more of elements selected from Cr, Mn, Fe, Co, Ni, and Cu in a total of 0.1 to 10 mass %. Addition of these elements mainly improves the adhesion of the plating to the steel material. If less than 0.1 mass %, this effect is small, while if over 10 mass %, the melting point of the plating bath is liable to rise too much and production to become difficult.

Further, the layer may contain as added elements one or more of elements selected from Bi, Mo, W, and Y in a total of 0.1 to 10 mass %. Addition of these elements mainly improves the adhesion of the plating to the steel material, but additionally has the effect of easily forming the non-equilibrium phase. If less than 0.1 mass %, there is little effect, while if over 10 mass %, the melting point of the plating bath rises too much or too much dross is formed, so production is liable to become difficult. In particular, Y further has the effect of improving the corrosion resistance.

Further, the layer may further contain as added elements, by mass %, one or more of La: 0.1 to 10%, Ce: 0.1 to 10%, Ca: 0.1 to 10%, Sn: 0.1 to 10%, P: 0.005 to 2%, and Si: 0.02 to 7%. Addition of these elements enables improvement of the ductility of the plating containing the non-equilibrium phase and an increase of the workability and further has the effect of easily forming a non-equilibrium phase. If less than the lower limits of the amounts of addition, the effect is small, while if over the upper limits, the corrosion resistance is liable to degrade.

The present inventors further engaged in R&D on plating species including the non-equilibrium phase and in the middle of this discovered that even in non-equilibrium phases, there are plating species which remarkably improve the effect of the non-equilibrium phase depending on the content of the typical non-equilibrium phase, that is, amorphous phase. That is, they discovered that even in the range of plating containing a non-equilibrium phase of the present invention, there is a remarkable effect of improvement of the sacrificial protection performance in a plating species with an amorphous volume percentage of 5% or more compared with one with an amorphous volume percentage of less than 5%. Usually, if the sacrificial protection property is improved, the corrosion rate of the plating sacrificially dissolved rises compared with the case of no sacrificial protection. In the steel material of the present invention with the non-equilibrium phase, there is the superior property of the sacrificial protection property being maintained while improving the corrosion resistance of the plating, but even so in the state where the iron metal is exposed and sacrificially corroded, somewhat of a rise of the corrosion rate is seen compared with the state of corrosion of the plating alone without exposure of the iron metal. This rise in the corrosion rate by sacrificial protection is further suppressed when the amorphous phase is 5% or more compared with when the amorphous phase is only less than 5%.

Even among platings with an amorphous phase of 5% or more, in particular if the contents of Zn, Al, and Mg are in the ranges satisfying the relationships of the following (Formula 6) to (Formula 8), the effect of suppression of the rise in the plating corrosion rate during sacrificial protection is large:

$$35 \leq Zn\% \leq 75 \quad \text{(Formula 6)}$$

$$0.08 \leq Al\% \leq 25 \quad \text{(Formula 7)}$$

$$22 \leq Mg\% \leq 60 \quad \text{(Formula 8)}$$

(wherein the element name % is the content by mass % of the element)

Preferably, making the concentration of Al 14 mass % or less results in a better sacrificial protection property so is preferable.

Further, in a plating species having an amorphous volume percent of 5% or more, by including in the plated layer one or more of elements from among Ca, Y, and La in a total mass % of 0.1 to 10%, there is an effect of improvement of the sacrificial protection property itself. With addition of 0.1 mass % or less, this effect is not clear, while if over 10 mass %, dross forms, the melting point rises, etc. and therefore production efficiency deteriorates.

The present inventors further engaged in separate research studying the improvement of the corrosion resistance of galvanized steel materials and in the process discovered that adding alloy components to the plated layer in order to improve the corrosion resistance, Zn and the added alloy components together form intermetallic compounds which cause deterioration of the workability and corrosion resistance of the plated layer. Even if there are no intermetallic compounds, if a crystal phase alloy plating, the formation of a supersaturated solute sometimes causes deterioration of the workability. In regards to this, the inventors came up with the idea of making the plating layer amorphous so as to eliminate all detrimental effects due to intermetallic compounds or supersaturated solutes and studied this. As a result, they discovered if including Zn in 35 mass % or more and forming a plating with an amorphous structure of a volume percentage of 50% or more, the corrosion resistance and workability are significantly improved compared with conventional plating with intermetallic compounds and supersaturated solutes. An amorphous structure is one type of typical non-equilibrium phase, so amorphous plating is one type of non-equilibrium phase plating.

Note that in general, the heat capacity in DSC is proportional to the volume percentage of the amorphous structure, but some change occurs even with the same volume percentages of amorphous phases depending on the combination of the elements. However, in the range of experiments run by the present inventors, plating containing an amorphous phase of a volume percentage of 5% or more always exhibits a heat capacity of 1 J/g or more by DSC.

If the Zn is less than 35 mass %, in particular the effect of suppression of corrosion of the steel material by the corrosion products of Zn can no longer be obtained. If Zn is less than 40 mass %, sometimes the sacrificial protection property required for a plated (steel material becomes insufficient or the corrosion resistance of the plating itself becomes insufficient, so preferably Zn is contained in an amount of 40 mass % or more. If the concentration of Zn is 50 mass % or more, it is more preferable. If the volume percentage of the amorphous structure is less than 50%, deterioration of the workability due to the crystal phase or a negative effect on the corrosion resistance due to electrochemical coupling of the crystal phases is liable not to be able to be covered. The greater the volume percentage of the amorphous structure, the better. If 90% or more, there is almost no detrimental effect of the crystal phase, so this is especially preferable.

The amorphous alloy plating containing Al at 0.07 to 45 mass % as alloy component forms an Al—Fe alloy or Al—Fe—X-based alloy at the interface with the iron metal so as to secure the minimum extent of plating adhesion as hot dip plating and forms a relatively stable oxide film at the plating bath surface layer so as to secure formation of dross, so is preferable. If less than 0.07 mass %, the effect to hard to appear. Al tends to inhibit somewhat the ability to form an amorphous structure in a Zn-based alloy, so even if included in over 45 mass %, a sufficient ability to form an amorphous structure able to be realized by the hot dip plating method can no longer be obtained, so the upper limit is made 45 mass %. 25 mass % or less is more preferable.

Mg improves the ability to form an amorphous structure of a Zn-based alloy and contributes to corrosion resistance as well, so inclusion in an amount of 1 to 55 mass % is preferable. If less than 1 mass %, this effect is hard to appear. If over 55 mass %, the plating becomes too active and the corrosion resistance is liable to degrade. When stressing the corrosion resistance, making this 25 mass % or less is preferable. If 25 mass % or less, the formation of dross is better suppressed and the operability is also improved.

On the other hand, when stressing improvement of the ability to form an amorphous structure, the content of Mg preferably made 25 to 60 mass %. In particular, with this Mg content, when the Zn is made 35 to 60 mass % and the Ca is made 1 to 10 mass %, the ability to form an amorphous structure is high, production is possible even with a low cooling rate, and a sufficient amorphous volume percentage is obtained even with a high deposition amount of plating. In this range of components, when making the content of Mg 34 to 55 mass %, Zn 40 to 60 mass %, and Ca 1 to 10 mass %, the ability to form an amorphous structure is high and the production ability is improved, so this is preferable.

Ca also improves the ability to form an amorphous structure of a Zn-based alloy and contributes to the corrosion resistance, so inclusion of 1 to 45 mass % is preferable. If less than 1 mass %, this effect is hard to appear. In over 45 mass %, the plating becomes too active and the corrosion resistance is liable to degrade. When stressing the corrosion resistance, making it 10 mass % or less is preferable.

Further, inclusion of Mg and Ca in a total of 5 mass % or more is preferable to secure in order to secure the minimum ability to form an amorphous structure for production of a hot dip plating. The total amount of addition of Mg and Ca is preferably large to a certain extent from the viewpoint of the ability to form an amorphous structure, but both are active elements, so when stressing corrosion resistance, a total of 60 mass % or less is preferable. A total of 35 mass % or less is more preferable.

As the added elements, inclusion of one or more of elements selected from Cr, Mn, Fe, Co, Ni, and Cu in a total of 0.1 to 10 mass % is possible. Addition of these elements mainly improves the adhesion of the plating to the steel material. If less than 0.1 mass %, this effect is hard to appear, while if over 10 mass %, the melting point of the plating bath rises too much and production is liable to become difficult.

As the added elements, inclusion of one or more of elements selected from Bi, Mo, W, Si, Ti, V, and Ag in a total of 0.1 to 10 mass % is possible. These elements have the composite effects of improving the ability to form an amorphous structure and improving the adhesion of the plating to the steel material. If less than 0.1 mass %, this effect is hard to appear, while if over 10 mass %, the melting point of the plating bath rises too much, a large amount of dross is formed, and production is liable to become difficult.

Further, as the added elements, inclusion of one or more of La: 0.1 to 10 mass %, Sn: 0.1 to 10 mass %, and P: 0.005 to 2 mass % is possible. Addition of these elements can improve the ductility of the amorphous phase and further increase the workability and has an effect of improvement of the ability to form an amorphous structure as well. If less than the lower limits of the added amounts, the effect is hard to appear, while if over the upper limits, the corrosion resistance is liable to degrade.

Note that a high corrosion resistance hot dip galvanized steel material of the present invention may have the above-mentioned alloy plated layer on the surface of the locations of the steel material requiring a high corrosion resistance. There is not necessarily a need to provide the plated layer over the entire surface of the steel material.

The high corrosion resistance hot dip galvanized steel material of the present invention can be used as a underlying steel material of a surface treated steel material used painted. At that time, it is possible to suppress the advance of corrosion blisters in the case of damage occurring reaching the iron metal after painting. Due to the feature of few cracks in the plated layer even after working, the corrosion resistance of a worked part after painting is particularly improved.

The material of the steel material used as the substrate of the steel material of the present invention is not particularly limited. An Al-killed steel, ultralow-carbon steel, high carbon steel, various high strength steels, Ni, Cr-containing steels, etc. may be used. The steelmaking method, the strength of the steel, the hot rolling method, the pickling method, the cold rolling method, and other pretreatment of the steel material are also not particularly limited.

In regard to the method of production of plating, the present technology can be applied to all sorts of methods of hot dip plating regardless of the Sendzimir type, flux type, pre-plating type, or other method of production. However, even in the range of the steel material of the present invention, depending on the ingredients, sometimes it is necessary to select the method of cooling or plating thickness according to the cooling rate required at the time of solidification of the plating alloy.

In the steel material of the present invention as well, in order to obtain an amorphous structure of a volume percentage of 50% or more in a plating of an alloy composition with a somewhat low ability to form an amorphous structure, the plating thickness has to be made small. This is because with the usual cooling method, the closer to the surface, the higher the cooling rate, so a thinner plating thickness means a greater amorphous volume percentage. On the other hand, even in the case of an alloy of an alloy composition with a somewhat low ability to form an amorphous structure, for example if using an ultralow temperature gas of −150° C. using the gas immediately after the evaporation of liquid nitrogen for cooling or using mist cooling, even if the plating thickness is thicker, an amorphous structure of a volume percentage of 50% or more is obtained.

When producing the steel material of the present (invention by hot dip plating where the plating thickness becomes thick, sometimes special cooling such as immersion in liquid nitrogen is required. Alternatively, when workability is not particularly required, by using as a plating alloy an alloy containing a large amount of Hf or Zr to improve the ability to form an amorphous structure, hot dip plating of an amorphous volume percentage falling within the range of the present invention is possible by a cooling rate of the extent of usual water cooling or even by air cooling depending on the combination of components. Hf and Zr are preferably included in a range, as a total of 2 mass % to 35 mass %. If less than 2 mass %, the effect of improvement of the ability to form an amorphous structure is insufficient, while if included over 35 mass %, in the same way as with Ca, the effect occurs of the activity in the plated layer becoming too great and the corrosion resistance of the plated layer being liable to be degraded.

The volume percentage of the amorphous structure can be measured by cutting upon a cross-section of the plated steel material, polishing and etching it, then observing the plated layer of the surface by an optical microscope (hereinafter abbreviated as a "opt. microscope"). At the part which became amorphous, no texture at all could be observed by etching, but at the remaining part of the crystal phase, texture due to grain boundaries, sub-grain boundaries, precipitates, and the like is observed. Due to this, the regions becoming the amorphous parts and crystal parts are clearly distinguishable, so it is possible to convert them to a volume fraction by the line segment method or image analysis. When the texture is too fine and measurement by an opt. microscope becomes difficult, a thin piece is fabricated from the cross-section of the plated layer and observed by a transmission electron microscope to enable measurement in the same way. In the case of a transmission electron microscope, in the unobserved region of the texture, the halo pattern of the electron diffraction pattern may be used to confirm the amorphous structure. In the case where no texture can be observed over the entire surface in observation by an opt. microscope or the case where even when there are parts where texture is not observed, there is a question of their being coarse grains free from strain, it is preferable to obtain a thin piece for an electron microscope and confirm the amorphous phase by the absence of diffraction spots in the electron beam diffraction image and observation of the halo pattern. Both with an opt. microscope and electron microscope, it is preferable to find the area ratios by image processing by a computer in 10 or more different fields, obtain the average of the area ratio, and use this as the volume fraction.

EXAMPLES

Example 1

Each surface treated steel material shown in Table 1 and Table 2 (continuation of Table 1) was prepared using cold rolled steel sheet of a sheet thickness 0.8 mm, equal angle steel of a thickness of 10 mm and a length of a side of 10 cm, or hot rolled steel sheet of a sheet thickness of 10 mm as a base material.

The cold rolled steel sheet was cut to 10 cm×10 cm, then plated by a batch type hot dip plating test apparatus of Resca Co., Ltd. The temperature of the plating bath was standardized to the melting point of the plating composition +50° C. in accordance with the plating composition. The coating weight was adjusted by air wiping, then the material was as required cooled by cooling by nitrogen gas of 25° C., mist cooling at 25° C., or cooled by low temperature nitrogen gas at −150° C. to adjust the cooling rate.

The equal angle steel was cut in a length of 10 cm in the longitudinal direction, while the hot rolled steel sheet was cut into a square of 10 cm×10 cm. Each was hot dip plated by the flux method using a crucible furnace. It was then cooled as needed by water cooling or liquid nitrogen cooling. The above plating test piece was used for each evaluation test shown below.

Regarding the ease of formation of the non-equilibrium phase, the plated steel material giving a non-equilibrium phase of a DSC heat capacity of 1 J/g or more was judged as "required cooling rate" by the cooling method and the plating deposition and the DSC heat capacity at that time.

For cold rolled steel sheet, a sample giving a non-equilibrium phase of a DSC heat capacity of 1 to 2 J/g by a combination of the cooling method of 25 g/m² or less by nitrogen gas cooling, 35 g/m² or less by mist cooling, or 60 g/m² or less by ultralow temperature nitrogen gas cooling utilizing the gas evaporated from liquid nitrogen and the plating thickness was judged as "required cooling rate: G (good)" and one giving a non-equilibrium phase of a DSC heat capacity over 2 J/g under these conditions or a DSC heat capacity of 1 J/g or more by a plating thickness of the conditions or more as "required cooling rate: VG (very good)". On the other hand, one with a DSC heat capacity of less than 1 J/g was judged as "requiring cooling rate: P (poor)".

Hot rolled steel sheet and equal angle steel produced by hot dip plating are difficult to control in plating thickness, so all plated steel materials giving a non-equilibrium phase with a DSC heat capacity of 1 J/g or more were judged as "required cooling rate: VG". On the other hand, a plated steel material with a DSC heat capacity of less than 1 J/g was judged as "requiring cooling rate: P".

The thickness of each plating was measured by the decrease in mass due to acid dissolution of the plated layer. The alloy components in the plating were determined by assaying a solution dissolving the plated layer by acid by ICP (inductive coupling plasma) spectroscopic analysis.

For assaying the non-equilibrium phase of the plated layer, the plated layer is machine ground off including the iron metal, the iron metal content is removed by a magnet, then the ground powder is used to measure the DSC curve from ordinary temperature to the melting point at a rate of temperature rise of 0.5° C./sec and the heat capacity is calculated from the area of the exothermic peak.

In the corrosion test, the sacrificial protection property and the corrosion resistance of the plated layer itself during the sacrificial protection action were simultaneously evaluated by preparing a sample with an exposed iron metal part and evaluating both the rust generation at the exposed iron metal part and plating loss by a cyclic corrosion test (CCT) repeating drying and wetting cycles.

The evaluated surface of the sample was made a rectangle of 50 mm×70 mm. The rest of the parts were protected by a tape seal. A 1 mm×50 mm rectangular part of the center of the evaluated surface was ground down 0.5 mm from the surface by an end mill to expose the iron metal. The end milling was performed while cooling the processed part. Consideration was given so that the non-equilibrium phase in the plated layer around the processed part did not change to an equilibrium phase.

The CCT conditions used were [salt spraying: 35° C., 5 g/L-NaCl aqueous solution, 2 hours]→[drying: 60° C., 20 to 30% RH, 4 hours]→[wetting: 50° C., 95% RH, 2 hours] (transition time between conditions is 30 minutes, included in conditions). The above 8 hours was designated as 1 cycle. The test was conducted for 21 cycles.

After the CCT test, first, the presence of rust formation of the iron metal part which had been exposed at the center of the evaluation surface was confirmed. A sample where no rust formation was observed at the exposed iron metal part was judged as having a sacrificial protection property of "G", a sample where rust formation was observed with a rust area ratio of 5% or less with respect to the area of the exposed part was judged as "F (fair)", and a sample when rust formed over an area over 5% was judged as "P". Next, the corrosion products were removed by pickling from each sample after the evaluation of the rust formation, the change in mass before and after the test was used to measure the corrosion loss of the plated layer. A sample with a corrosion loss of less than 2 g/m$^2$ was designated as "VG", one of 2 to 5 g/m$^2$ as "G", and one of 5 g/m$^2$ or more as "P".

For part of the plated steel materials with a sacrificial protection property "G", as another type of corrosion test piece, a 3 mm×50 mm rectangular part at the center of the evaluation surface was ground down 0.5 mm from the surface by an end mill to expose the iron metal. The sample was used as a "sacrificial protection promotion test piece". This "sacrificial protection promotion test piece" was used for the same CCT as above. After the CCT test, first, the presence of rust formation of the iron metal part which had been exposed at the center of the evaluation surface was confirmed. A sample where no rust formation was observed at the exposed iron metal part was judged as having a sacrificial protection property "VGVG", while a sample where rust formation was observed with a rust area ratio of 5% or less with respect to the area of the exposed part was judged as "VG". Even with a sample where rust formed over an area over 5% was evaluated as "G" since the original evaluation was "G".

Next, for the "sacrificial protection promotion test pieces" as well, the corrosion products were removed from each sample after rust evaluation by pickling and the change in mass before and after the test was used to measure the corrosion loss of the plated layer. Using the corrosion loss at a sample with an exposed iron metal surface of a size of 1 mm×50 mm as CR1 and the corrosion loss at the "sacrificial protection promotion test piece" as CR2, the value of CR2 divided by CR1 (CR2/CR1) was evaluated as the suppressability of corrosion acceleration by sacrificial protection. A value of CR2/CR1 of 1.05 or less was expressed as "VG", a value over 1.05 to 1.15 was expressed as "G", and a value of over 1.15 was expressed as "F". An originally inferior sacrificial protection property was deemed outside the scope of evaluation.

The plating adhesion was evaluated for a cold rolled steel sheet by bending the plated test piece 180° with the plated layer on the outer side, performing a so-called 0T adhesion bending test, then peeling off the plated layer from the bent part by adhesive tape. A sample with no peeling was evaluated as "VG", a sample with peeling, but with no peeled piece with a maximum length of over 0.1 mm around the 10 mm length of the bent part and with five or less peeled pieces with a maximum length of 0.1 mm or less was evaluated as "G", and similarly a sample with one or more peeled pieces of a size over 0.1 mm or over six peeled pieces of a size of 0.1 mm or less was evaluated as "P".

For the plating adhesion of the equal angle steel and the hot rolled steel sheet, the plated layer was subjected to a peeling test by adhesive tape without bending and similarly evaluated. That is, a sample with no peeling was evaluated as "VG", a sample with peeling, but with no peeled piece with a maximum length of over 0.1 mm in the 10 mm×10 mm square region and with five or less peeled pieces with a maximum length of 0.1 mm or less was evaluated as "G", and similarly a sample with one or more peeled pieces of a size over 0.1 mm or over six peeled pieces of a size of 0.1 mm or less was evaluated as "P". With the cold rolled steel sheet and equal angle steel or hot rolled steel sheet, direct comparison was not possible, but a relative comparison is possible in these types of steel.

The workability of the plated layer was evaluated by the diameter of the maximum inscribed circle where no cracks are observed in the plated layer by the 180° bending test. However, when using as the unit of the diameter of the inscribed circle the sheet thickness T, a sample with a diameter of the maximum inscribed circle without cracks of 0T, that is, with no cracks seen even with adhesion bending, was evaluated as "VG", a sample with a diameter of the maximum inscribed circle of 1T to 3T was evaluated as "G", and a sample with 4T or more was evaluated as "P". The equal angle steel and hot rolled steel sheet are not materials requiring this evaluation, so were not evaluated and was indicated as "–".

Further, part of the types of steel exhibiting a sufficient sacrificial protection property in Table 1 and Table 2 (continuation of Table 1), specifically Sample Nos. 1 to 10, 29, 47 to 51, and 54, were measured for the amorphous volume percentage of the plated layer. The volume percentage of the amorphous structure of the plated layer was determined by obtaining two thin pieces for transmission electron microscope use at each of the positions dividing the thickness of the plated layer of the test piece into five equal parts, measuring the area ratio of the amorphous region of each field by image analysis using a computer, and taking the average value of the area ratios of the amorphous regions of all fields as the volume percentage of the amorphous structure.

Table 3 shows the amorphous volume percentage in the plated layer, the sacrificial protection property under severe conditions using a "sacrificial protection promotion test piece" (accelerated sacrificial protection property), and suppression of corrosion acceleration at the time of sacrificial protection (CR2/CR1).

TABLE 1

| | | Steel | Plating composition [mass %] | | | | Cooling method *1 | Deposition g/m$^2$ | DSC heat cap. J/g | Corrosion resistance | Sacrificial protection | Adhesion | Req. cooling rate *2 | Workability |
|---|---|---|---|---|---|---|---|---|---|---|---|---|---|---|
| | No. | material | Zn | Mg | Al | Other | | | | | | | | |
| Inv. ex. | 1 | Cold rolled steel | 69.8 | — | 26 | 0.2Cr, 4Hf | A | 20 | 5.5 | G | G | VG | G | G |
| | 2 | | 75 | — | 20 | 5Zr | B | 30 | 2.5 | G | G | G | G | G |

TABLE 1-continued

| Steel No. | Steel material | Plating composition [mass %] Zn | Mg | Al | Other | Cooling method *1 | Deposition g/m² | DSC heat cap. J/g | Corrosion resistance | Sacrificial protection | Adhesion | Req. cooling rate *2 | Workability |
|---|---|---|---|---|---|---|---|---|---|---|---|---|---|
| 3 | sheet | 82 | — | 15 | 3Ca | C | 55 | 3.4 | G | G | G | G | VG |
| 4 | | 50 | 43 | 5 | 2La | B | 24 | 1.3 | VG | G | G | G | VG |
| 5 | | 41 | 43 | 16 | | B | 33 | 1.8 | VG | G | G | G | G |
| 6 | | 67 | 28 | 5 | | B | 33 | 1.6 | VG | G | G | G | G |
| 7 | | 44 | 28 | 25 | 3Ce | B | 33 | 1.5 | VG | G | G | G | VG |
| 8 | | 82.9 | 17 | 0.1 | | C | 15 | 1.1 | VG | G | G | G | G |
| 9 | | 78 | 17 | 5 | | B | 30 | 1.2 | VG | G | G | G | G |
| 10 | | 72 | 17 | 11 | | B | 45 | 3.6 | VG | G | G | VG | G |
| 11 | | 67.8 | 17 | 15 | 0.2Fe | B | 30 | 2.3 | VG | G | VG | VG | G |
| 12 | | 65 | 17 | 18 | | C | 70 | 4.7 | VG | G | G | VG | G |
| 13 | | 56 | 17 | 25 | 2Ni | B | 32 | 1.7 | VG | G | VG | G | G |
| 14 | | 41 | 17 | 42 | | A | 15 | 1.4 | VG | G | G | G | G |
| 15 | | 87.9 | 12 | 0.1 | | C | 20 | 1 | VG | G | G | G | G |
| 16 | | 83 | 12 | 5 | | C | 55 | 3.2 | VG | G | G | VG | G |
| 17 | | 77 | 12 | 11 | | C | 75 | 1.6 | VG | G | G | VG | G |
| 18 | | 68.5 | 12 | 18 | 1Mn, 0.5Ca | B | 30 | 5.3 | VG | G | VG | VG | VG |
| 19 | | 62 | 12 | 25 | 1Sn | C | 55 | 1.4 | VG | G | G | G | VG |
| 20 | | 43 | 12 | 45 | | B | 30 | 1.3 | VG | G | G | G | G |
| 21 | | 91.9 | 8 | 0.1 | | C | 70 | 1.1 | VG | G | G | VG | G |
| 22 | | 89 | 8 | 3 | | B | 45 | 2.2 | VG | G | G | VG | G |
| 23 | | 87 | 8 | 5 | | B | 60 | 1.8 | VG | G | G | VG | G |
| 24 | | 81 | 8 | 11 | 0.2Si | C | 70 | 2.5 | VG | G | G | VG | VG |
| 25 | | 77 | 8 | 15 | | B | 55 | 4.3 | VG | G | G | VG | G |
| 26 | | 74 | 8 | 18 | | B | 30 | 1.8 | VG | G | G | G | G |
| 27 | | 67 | 8 | 25 | | B | 25 | 1.6 | VG | G | G | G | G |
| 28 | | 47 | 8 | 45 | 0.5Co | B | 25 | 1.1 | VG | G | VG | G | G |
| 29 | | 94.9 | 5 | 0.1 | | C | 15 | 1.1 | VG | G | G | G | G |
| 30 | | 92 | 5 | 3 | | B | 40 | 1.5 | VG | G | G | VG | G |
| 31 | | 90 | 5 | 5 | | C | 55 | 3.5 | VG | G | G | VG | G |
| 32 | | 88 | 5 | 7 | | B | 30 | 2.8 | VG | G | G | VG | G |
| 33 | | 84 | 5 | 11 | | B | 33 | 1.6 | VG | G | G | G | G |
| 34 | | 70 | 5 | 25 | 1Cu | B | 30 | 1.4 | VG | G | VG | G | G |
| 35 | | 41 | 5 | 54 | | B | 30 | 1.2 | VG | G | G | G | G |
| 36 | | 96.9 | 3 | 0.1 | | C | 15 | 1.1 | VG | G | G | G | G |
| 37 | | 94 | 3 | 3 | | B | 30 | 2.6 | VG | G | G | VG | G |
| 38 | | 92 | 3 | 5 | | B | 45 | 1.8 | VG | G | G | VG | G |
| 39 | | 86 | 3 | 11 | | B | 30 | 1.5 | VG | G | G | G | G |
| 40 | | 69.9 | 3 | 25 | 2Ni, 0.1P | B | 30 | 1.8 | VG | G | VG | G | VG |

TABLE 2

(continuation of Table 1)

| | Steel No. | Steel material | Plating composition [mass %] Zn | Mg | Al | Other | Cooling method *1 | Deposition g/m² | DSC heat cap. J/g | Corrosion resistance | Sacrificial protection | Adhesion | Req. cooling rate *2 | Workability |
|---|---|---|---|---|---|---|---|---|---|---|---|---|---|---|
| Inv. ex. | 41 | Cold rolled steel sheet | 41 | 3 | 56 | | B | 20 | 1.6 | VG | G | G | G | G |
| | 42 | | 98.9 | 1 | 0.1 | | B | 15 | 1 | VG | G | G | G | G |
| | 43 | | 94 | 1 | 5 | | B | 20 | 1.5 | VG | G | G | G | G |
| | 44 | | 88 | 1 | 11 | | B | 30 | 1.7 | VG | G | G | G | G |
| | 45 | | 43 | 1 | 56 | | B | 34 | 1.3 | VG | G | G | G | G |
| | 46 | | 36 | — | 59.8 | 0.2Cr, 4Hf | A | 20 | 5.5 | G | F | VG | G | G |
| | 47 | | 37 | 46 | 17 | | B | 30 | 2.5 | G | G | G | G | G |
| | 48 | | 37 | 51 | 12 | | C | 55 | 3.4 | G | G | G | G | G |
| | 49 | | 37 | 58 | 5 | | B | 24 | 1.3 | G | G | G | G | G |
| | 50 | | 65.8 | 28 | 5 | 1Bi, 0.2W | B | 33 | 2.8 | VG | G | VG | VG | G |
| | 51 | | 44 | 28 | 27 | 1Bi | B | 42 | 2.2 | VG | G | VG | VG | G |
| | 52 | | 77.5 | 17 | 5 | 0.5 Mo | B | 46 | 1.9 | VG | G | VG | VG | G |
| | 53 | | 61.5 | 12 | 25 | 0.5W | C | 75 | 2.1 | VG | G | VG | VG | G |
| | 54 | | 66.5 | 8 | 25 | 0.5Y | B | 38 | 2.8 | VG | G | VG | VG | G |
| | 55 | Hot rolled steel sheet | 87 | 8 | 5 | | D | 150 | 1.5 | VG | G | VG | VG | — |

TABLE 2-continued (continuation of Table 1)

| | No. | Steel material | Plating composition [mass %] | | | | Cooling method *1 | Deposition g/m² | DSC heat cap. J/g | Corrosion resistance | Sacrificial protection | Adhesion | Req. cooling rate *2 | Workability |
|---|---|---|---|---|---|---|---|---|---|---|---|---|---|---|
| | | | Zn | Mg | Al | Other | | | | | | | | |
| | 56 | Equal angle steel | 87 | 8 | 5 | | E | 220 | 1.3 | VG | G | G | VG | — |
| Comp. ex. | 57 | Cold rolled steel sheet | 85.8 | 3 | 12 | 0.2Si | A | 90 | 0 | VG | P | VG | P | P |
| | 58 | | 40.5 | 3 | 55 | 1.5Si | A | 60 | 0.1 | VG | P | G | P | P |
| | 59 | | 20 | 15 | 60 | 5Ca | B | 45 | 5.2 | VG | P | G | VG | G |
| | 60 | Hot rolled steel sheet | 87 | 8 | 5 | | F | 150 | 0 | VG | P | G | P | — |

*1: A: Gas cooling (25° C. nitrogen), B: Mist cooling (25° C.), C: Supercooled gas (−150° C. nitrogen), D: Water cooling, E: Liquid nitrogen cooling, F: Natural cooling
*2: Combination of cooling method (*1) and plating deposition able to achieve DSC heat capacity of 1 J/g or more
VG (very good): With A, over 25 g/m², with B, over 35 g/m², and with C, over 60 g/m² (if condition of G, 2 J/g or more)
G (good): With A, 25 g/m² or less, with B, 35 g/m² or less, and with C, 60 g/m² or less
P (poor): DSC heat capacity of less than 1 J/g

TABLE 3

| | No. | Steel material | Platin composition [mass %] | | | | Cooling method *1 | Deposition g/m² | DSC heat cap. J/g | Amorphous vol % (%) | Corrosion resistance | Accel. protection | Corrosion acceleration suppression |
|---|---|---|---|---|---|---|---|---|---|---|---|---|---|
| | | | Zn | Mg | Al | Others | | | | | | | |
| Inv. ex. | 1 | Cold rolled steel sheet | 69.8 | — | 26 | 0.2Cr, 4Hf | A | 20 | 5.5 | 22 | G | G | G |
| | 2 | | 75 | — | 20 | 5Zr | B | 30 | 2.5 | 10 | G | G | G |
| | 3 | | 82 | — | 15 | 3Ca | C | 55 | 3.4 | 14 | G | VG | G |
| | 4 | | 50 | 43 | 5 | 2La | B | 24 | 1.3 | 5 | VG | VGVG | VG |
| | 5 | | 41 | 43 | 16 | | B | 33 | 1.8 | 7 | VG | G | VG |
| | 6 | | 67 | 28 | 5 | | B | 33 | 1.6 | 6 | VG | VG | VG |
| | 7 | | 44 | 28 | 25 | 3Ce | B | 33 | 1.5 | 6 | VG | G | VG |
| | 8 | | 82.9 | 17 | 0.1 | | C | 15 | 1.1 | 4 | VG | G | F |
| | 9 | | 78 | 17 | 5 | | B | 30 | 1.2 | 5 | VG | VG | G |
| | 10 | | 72 | 17 | 11 | | B | 45 | 3.6 | 14 | VG | VG | G |
| | 29 | | 94.9 | 5 | 0.1 | | C | 15 | 1.1 | 4 | VG | G | F |
| | 47 | | 37 | 46 | 17 | | B | 30 | 2.5 | 10 | G | G | VG |
| | 48 | | 37 | 51 | 12 | | C | 55 | 3.4 | 14 | G | VG | VG |
| | 49 | | 37 | 58 | 5 | | B | 24 | 1.3 | 5 | G | VG | VG |
| | 50 | | 65.8 | 28 | 5 | 1Bi, 0.2W | B | 33 | 2.8 | 11 | VG | VG | VG |
| | 51 | | 44 | 28 | 27 | 1Bi | B | 42 | 2.2 | 9 | VG | VG | VG |
| | 54 | | 66.5 | 8 | 25 | 0.5Y | B | 38 | 2.8 | 11 | VG | G | G |
| Co. ex. | 57 | Cold rolled steel sheet | 85.8 | 3 | 12 | 0.2Si | A | 90 | 0 | 0 | VG | P | — |
| | 58 | | 40.5 | 3 | 55 | 1.5Si | A | 60 | 0.1 | 0 | VG | P | — |
| | 59 | | 20 | 15 | 60 | 5Ca | B | 45 | 5.2 | 21 | VG | P | — |

*1: A: Gas cooling (25° C. nitrogen), B: Mist cooling (25° C.), C: Supercooled gas (−150° C. nitrogen), D: Water cooling, E: Liquid nitrogen cooling, F: Natural cooling As shown in Table 1 and Table 2 (continuation of Table 1), the steel material of the present invention is superior in corrosion resistance and maintains sufficient performance in terms of plating adhesion, workability, dross formation, etc. In particular, the steel material of the present invention containing Mg in an amount of 1 to 55 mass % and Al in an amount of 0.07 to 45 mass % is further superior in terms of corrosion resistance. Among these, the steel material of the present invention with a Zn—Al—Mg balance of a composition of the range shown in FIG. 2 requires only a small cooling rate for production, so could be produced even with cooling using mist cooling. Further, a material containing one or more of elements selected from Cr, Mn, Fe, Co, Ni, and Cu was particularly improved in adhesion, while one containing one or more of elements selected from La, Ce, Ca, Sn, and P was particularly improved in workability. Further, with Zn of 40 mass % or less, sometimes the sacrificial corrosion prevention property becomes somewhat inferior, but with plating including Mg and Al, a sufficient sacrificial protection property is secured. A material containing Bi, Mo, W, or Y is simultaneously superior in both performances of adhesion and required cooling rate.

A material not with a range of chemical components of the plated steel material of the present invention or with a DSC heat capacity due to the non-equilibrium phase of less than 1 J/g is insufficient in corrosion resistance or even if good in corrosion resistance of the plated layer itself, is insufficient in sacrificial protection property and suffers from rust of an area ratio of 5% or more at the exposed iron metal part.

As shown in Table 3, the steel material of the present invention with an amorphous volume percentage of 5% or more is suppressed in corrosion acceleration at the time of sacrificial protection compared with other types of steel. This effect became more remarkable in the range of components defined in (Formula 6) to (Formula 8). Further, the steel material of the present invention with Al of 14 mass % or less was superior in sacrificial protection property compared to other steel material of the present invention.

Example 2

Each of the surface treated steel materials shown in Table 4 and Table 5 (continuation of Table 4) were prepared using cold rolled steel sheet of a sheet thickness of 0.8 mm, equal angle steel of a thickness of 10 mm and a length of a side of 10 mm, or hot rolled steel sheet of a sheet thickness of 10 mm as base materials.

The cold rolled steel sheet was cut to 10 cm×10 cm, then plated by a batch type hot dip plating test apparatus of Resca Co., Ltd. The temperature of the plating bath was standardized to the melting point of the plating composition +50° C. in accordance with the plating composition. The coating weight was adjusted by air wiping, then the material was as required cooled by cooling by nitrogen gas of 25° C., mist cooling at 25° C., or cooled by low temperature nitrogen gas at −150° C. to adjust the cooling rate.

The equal angle steel was cut in a length of 10 cm in the longitudinal direction, while the hot rolled steel sheet was cut into a square of 10 cm×10 cm. Each was hot dip plated by the flux method using a crucible furnace. It was then cooled as needed by water cooling or liquid nitrogen cooling. The above plating test piece was used for each evaluation test shown below.

Regarding the required critical cooling rate showing the ability to form an amorphous structure, the amorphous structure is formed by the plated layer of the surface of the steel material, so does not always correspond to the bulk cooling rate of the steel material. Because of this, the cooling method and the plating deposition and the amorphous volume percentage at that time were used for judgment. The ability to form an amorphous structure is somewhat low depending on the alloy composition of the plating bath. Depending on the cooling method, materials requiring reduction of the plating deposition to 25 g/m$^2$ or less with nitrogen gas cooling, 35 g/m$^2$ or less with mist cooling, and 60 g/m$^2$ or less even with ultralow temperature nitrogen gas cooling utilizing gas evaporated from liquid nitrogen to obtain an amorphous volume percentage of 50% or more were judged as "G". Materials not achieving an amorphous volume percentage of 50% even under these conditions were judged as "P". Further, among the materials with a high ability to form an amorphous structure of "G", ones enabling an increase in the plating deposition to less than 30 g/m$^2$ by nitrogen gas cooling, to less than 45 g/m$^2$ by mist cooling, and to 80 g/m$^2$ by ultralow temperature nitrogen gas cooling utilizing the gas evaporated from liquid nitrogen in order to obtain an amorphous volume percentage of no less than 50% were judged as "VG", while ones giving an amorphous volume percentage of 50% or more even under conditions of 30 g/m$^2$ or more by nitrogen gas cooling, 45 g/m$^2$ or more by at mist cooling, and 80 g/m$^2$ or more by ultralow temperature nitrogen gas cooling utilizing gas evaporated from liquid nitrogen were judged as "VGVG".

The state of dross at the time of plating production was observed visually. A material with large dross and difficult plating was judged as "P", one with a relatively large amount of dross and possible plating was judged as "F", one with a small amount of dross and easy plating production was judged as "G", and one with an extremely small amount of dross, easy plating production, and relatively good properties of the plating surface was judged as "VG".

The plating deposition was measured by the mass loss due to acid dissolution of the plated layer. The alloy components in the plating were determined by analysis of a solution in which the plated layer was dissolved by an acid by ICP (inductive coupling plasma) spectroscopic analysis.

The volume percentage of the amorphous structure of the plated layer was determined by obtaining two thin pieces for transmission electron microscope use at each of the positions dividing the thickness of the plated layer of the test piece into five equal parts, measuring the area ratio of the amorphous region of each field by image analysis using a computer, and taking the average value of the area ratios of the amorphous regions of all fields as the volume percentage of the amorphous structure.

The corrosion test was performed based on the salt spray test (SST) described in JIS-Z-2371. However, the corrosion loss after running a test using a salt water concentration of 10 g/L for 3000 hours was used for the evaluation. A material with less than 2 g/m$^2$ was judged as "VG", 2 to 5 g/m$^2$ as "G", 5 to 10 g/m$^2$ as "F", and over 10 g/m$^2$ as "P".

The plating adhesion was evaluated for a cold rolled steel sheet by bending the plated test piece by 180° with the plating layer outward, running a so-called 0T adhesion bending test, then peeling off the plated layer from the bent part by adhesive tape. A sample with no peeling was evaluated as "VG", a sample with peeling, but with no peeled piece with a maximum length of over 0.1 mm around the 10 mm length of the bent part and with five or less peeled pieces with a maximum length of 0.1 mm or less was evaluated as "G", similarly a sample with six to 10 peeled pieces of a size of 0.1 mm or less was evaluated as "F", and a sample with one or more peeled pieces of a size over 0.1 mm or over 10 peeled pieces of a size of 0.1 mm or less was evaluated as "P".

For the plating adhesion of the equal angle steel and the hot rolled steel sheet, the plated layer was subjected to a peeling test by adhesive tape without bending and similarly evaluated. That is, a sample with no peeling was evaluated as "VG", a sample with peeling, but with no peeled piece with a maximum length of over 0.1 mm in the 10 mm×10 mm square region and with five or less peeled pieces with a maximum length of 0.1 mm or less was evaluated as "G", similarly a sample with six to 10 peeled pieces of a size over 0.1 mm or over six peeled pieces of a size of 0.1 mm or less was evaluated as "F", and a sample with one or more peeled pieces of a size over 0.1 mm or over 10 peeled pieces of a size of 0.1 mm or less was evaluated as "F". With the cold rolled steel sheet and equal angle steel or hot rolled steel sheet, direct comparison was not possible, but a relative comparison is possible in these types of steel.

The workability of the plated layer was evaluated by the diameter of the maximum inscribed circle where no cracks are observed in the plated layer by the 180° bending test. However, when using as the unit of the diameter of the inscribed circle the sheet thickness T, a sample with a diameter of the maximum inscribed circle without cracks of 0T, that is, with no cracks seen even with adhesion bending, was evaluated as "VG", a sample with a diameter of the maximum inscribed circle of 1T was evaluated as "G", a sample with a diameter of the maximum inscribed circle of 2T to 3T was evaluated as "F", and a sample with 4T or more was evaluated as "P". The equal angle steel and hot rolled steel sheet are not materials requiring this evaluation, so were not evaluated and was indicated as "−".

TABLE 4

| | No. | Steel material | Plating composition mass % | | | | | Deposition g/m² | Cooling method *1 | Amorphous vol % (%) | Corrosion resistance | Plating adhesion | Req. cooling rate *2 | Workability | Dross |
|---|---|---|---|---|---|---|---|---|---|---|---|---|---|---|---|
| | | | Zn | Mg | Ca | Al | Other | | | | | | | | |
| Inv. ex. | 61 | Cold rolled steel sheet | 42 | — | 55 | — | 3Hf | 34 | B | 80 | G | F | G | F | F |
| | 62 | | 44.8 | — | 50 | — | 5Zr, 0.2Cr | 23 | A | 80 | G | VG | G | G | F |
| | 63 | | 55 | 10 | — | — | 30Zr, 5La | 45 | B | 95 | G | F | VGVG | F | F |
| | 64 | | 41 | 53 | 6 | — | | 90 | A | 100 | G | F | VGVG | F | F |
| | 65 | | 58 | 37 | 5 | — | | 120 | A | 100 | G | F | VGVG | F | F |
| | 66 | | 55 | 40 | — | — | 5La | 55 | A | 100 | G | F | VGVG | F | F |
| | 67 | | 41.9 | 52 | 6 | 0.1 | | 80 | A | 100 | G | G | VGVG | G | G |
| | 68 | | 46.4 | 52 | 1.5 | 0.1 | | 50 | A | 100 | G | G | VGVG | G | G |
| | 69 | | 51.7 | 40 | 8 | 0.1 | 0.2Mn | 60 | A | 100 | G | VG | VGVG | G | G |
| | 70 | | 41 | 40 | 8 | 11 | | 60 | A | 100 | G | G | VGVG | G | G |
| | 71 | | 54.7 | 40 | 5 | 0.1 | 0.2Sn | 90 | A | 100 | G | G | VGVG | VG | G |
| | 72 | | 61.9 | 35 | 1.5 | 0.1 | 1Mn, 0.5Sn | 45 | A | 100 | G | VG | VGVG | VG | G |
| | 73 | | 52.2 | 35 | 1.5 | 11 | 3Sn | 50 | A | 100 | G | G | VGVG | VG | G |
| | 74 | | 41.9 | 30 | 28 | 0.1 | | 34 | B | 80 | G | G | G | G | G |
| | 75 | | 63.9 | 30 | 6 | 0.1 | | 55 | C | 80 | G | G | G | G | G |
| | 76 | | 67.7 | 30 | 2 | 0.1 | 0.2La | 30 | A | 70 | G | G | VGVG | VG | G |
| | 77 | | 41.7 | 20 | 38 | 0.1 | 0.2Fe | 50 | B | 60 | G | VG | G | G | G |
| | 78 | | 41.8 | 20 | 30 | 7 | 1Ni, 0.2P | 30 | A | 70 | G | VG | VGVG | VG | G |
| | 79 | | 59.9 | 20 | 20 | 0.1 | | 40 | C | 80 | G | G | G | G | G |
| | 80 | | 42 | 20 | 20 | 18 | | 30 | C | 80 | G | G | G | G | G |
| | 81 | | 70.9 | 20 | 9 | 0.1 | | 50 | C | 70 | VG | G | G | G | VG |
| | 82 | | 66 | 20 | 9 | 5 | | 50 | C | 70 | VG | G | G | G | VG |
| | 83 | | 60 | 20 | 9 | 11 | | 50 | C | 70 | VG | G | G | G | VG |
| | 84 | | 48 | 20 | 9 | 23 | | 50 | C | 70 | VG | G | G | G | VG |
| | 85 | | 74.7 | 20 | 5 | 0.1 | 0.2Co | 45 | C | 70 | VG | VG | G | G | VG |
| | 86 | | 70 | 20 | 5 | 5 | | 50 | C | 70 | VG | G | G | G | VG |
| | 87 | | 77.9 | 20 | 2 | 0.1 | | 50 | C | 60 | VG | G | G | G | VG |
| | 88 | | 41.9 | 14 | 44 | 0.1 | | 50 | B | 90 | G | G | G | G | G |
| | 89 | | 76.9 | 14 | 9 | 0.1 | | 30 | C | 80 | VG | G | G | G | VG |
| | 90 | | 42 | 14 | 9 | 35 | | 25 | C | 80 | G | G | G | G | G |
| | 91 | | 80.9 | 14 | 5 | 0.1 | | 30 | C | 80 | VG | G | G | G | VG |
| | 92 | | 78 | 14 | 5 | 3 | | 40 | C | 70 | VG | G | G | G | VG |
| | 93 | | 76 | 14 | 5 | 5 | | 45 | C | 65 | VG | G | G | G | VG |
| | 94 | | 83.9 | 14 | 2 | 0.1 | | 60 | C | 70 | VG | G | G | G | VG |
| | 95 | | 42 | 8 | 42 | 8 | | 50 | B | 90 | G | G | G | G | G |
| | 96 | | 56 | 8 | 30 | 5 | 1Ni | 60 | B | 90 | G | VG | G | G | G |
| | 97 | | 73.9 | 8 | 18 | 0.1 | | 50 | B | 70 | G | G | G | G | G |
| | 98 | | 82.9 | 8 | 9 | 0.1 | | 60 | C | 90 | VG | G | G | G | VG |
| | 99 | | 80 | 8 | 9 | 3 | | 35 | C | 80 | VG | G | G | G | VG |
| | 100 | | 86.9 | 8 | 5 | 0.1 | | 40 | C | 80 | VG | G | G | G | VG |

TABLE 5

(continuation of Table 4)

| | No. | Steel material | Plating composition, mass % | | | | | Deposition g/m² | Cooling method *1 | Amorphous vol % (%) | Corrosion resistance | Plating adhesion | Req. cooling rate *2 | Workability | Dross |
|---|---|---|---|---|---|---|---|---|---|---|---|---|---|---|---|
| | | | Zn | Mg | Ca | Al | Other | | | | | | | | |
| Inv. ex. | 101 | Cold rolled steel sheet | 89.9 | 8 | 2 | 0.1 | | 45 | C | 70 | VG | G | G | G | VG |
| | 102 | | 87.9 | 3 | 9 | 0.1 | | 45 | C | 90 | VG | G | G | G | VG |
| | 103 | | 85 | 3 | 9 | 3 | | 40 | C | 80 | VG | G | G | G | VG |
| | 104 | | 82.7 | 3 | 9 | 5 | 0.3Cu | 40 | C | 70 | VG | VG | G | G | VG |
| | 105 | | 91.9 | 3 | 5 | 0.1 | | 35 | C | 70 | VG | G | G | G | VG |
| | 106 | | 88.8 | 3 | 5 | 3 | 0.2La | 30 | A | 60 | VG | G | VGVG | VG | VG |
| | 107 | | 93.9 | 3 | 3 | 0.1 | | 35 | C | 60 | VG | G | G | G | VG |
| | 108 | | 55.4 | 1.5 | 43 | 0.1 | | 30 | B | 80 | G | G | G | G | G |
| | 109 | | 50.3 | 1.5 | 43 | 5 | 0.2Sn | 60 | A | 80 | G | G | VGVG | VG | G |
| | 110 | | 89.4 | 1.5 | 9 | 0.1 | | 35 | C | 80 | VG | G | G | G | VG |
| | 111 | | 86.5 | 1.5 | 9 | 3 | | 40 | C | 70 | VG | G | G | G | VG |
| | 112 | | 93.4 | 1.5 | 5 | 0.1 | | 40 | C | 60 | VG | G | G | G | VG |
| | 113 | | 35.5 | 46 | 15 | — | 3.5Hf | 50 | B | 100 | F | F | VGVG | F | G |
| | 114 | | 36 | 58 | 6 | — | | 90 | B | 100 | F | F | VGVG | F | G |
| | 115 | | 35.9 | 58 | 6 | 0.1 | | 40 | B | 100 | F | G | VG | G | G |
| | 116 | | 38.9 | 56 | 5 | 0.1 | | 75 | C | 100 | F | G | VG | G | G |
| | 117 | | 38 | 56 | 5 | 1 | | 40 | B | 100 | F | G | VG | G | G |
| | 118 | | 57 | 27 | 8 | 8 | | 70 | C | 100 | G | G | VG | G | G |

TABLE 5-continued (continuation of Table 4)

| | Steel | Plating composition, mass % | | | | | Deposition | Cooling method | Amorphous vol % | Corrosion | Plating adhe- | Req. cooling | | |
|---|---|---|---|---|---|---|---|---|---|---|---|---|---|---|
| | No. | material | Zn | Mg | Ca | Al | Other | g/m² | *1 | (%) | resistance | sion | rate *2 | Workability | Dross |
| | 119 | | 59 | 31 | 1.5 | 8.5 | | 65 | C | 100 | G | G | VG | G | G |
| | 120 | | 41 | 51 | 6 | — | 2Bi | 45 | A | 100 | G | G | VGVG | G | G |
| | 121 | | 40.9 | 52 | 6 | 0.1 | 1Mo | 40 | A | 100 | G | VG | VGVG | G | G |
| | 122 | | 41.4 | 30 | 28 | 0.1 | 0.5W | 85 | C | 80 | G | VG | VGVG | G | G |
| | 123 | | 63.4 | 30 | 6 | 0.1 | 0.5V | 50 | B | 80 | G | VG | VGVG | G | G |
| | 124 | | 58.9 | 20 | 20 | 0.1 | 1Ti | 90 | C | 80 | G | VG | VGVG | G | G |
| | 125 | | 41.5 | 20 | 20 | 18 | 0.5Si | 90 | C | 80 | G | VG | VGVG | G | G |
| | 126 | | 68.9 | 20 | 9 | 0.1 | 2Ag | 95 | C | 70 | VG | VG | VGVG | G | VG |
| | 127 | | 59.5 | 20 | 9 | 11 | 0.5Y | 55 | B | 70 | VG | VG | VGVG | G | VG |
| | 128 | Hot rolled steel sheet | 51.7 | 40 | 8 | 0.1 | 0.2Mn | 150 | D | 100 | G | VG | VGVG | — | G |
| | 129 | Equal angle steel | 55.7 | 38 | 6 | 0.1 | 0.2Ni | 220 | E | 100 | G | VG | VGVG | — | G |
| Co. ex. | 130 | Cold rolled steel sheet | 84.5 | 3 | 0.5 | 12 | | 55 | A | 0 | P | F | P | P | G |
| | 131 | | 97.5 | 0.5 | 2 | 0.1 | | 60 | A | 0 | P | F | P | P | F |
| | 132 | | 43.5 | — | — | 55 | 1.5Si | 60 | A | 0 | G | G | P | P | G |
| | 133 | | 30.5 | 8.5 | 61 | — | | 100 | A | 100 | P | P | VGVG | P | P |

*1: A: Gas cooling (25° C. nitrogen), B: Mist cooling (25° C.), C: Supercooled gas (−150° C. nitrogen), D: Water cooling, E: Liquid nitrogen cooling
*2: Combination of cooling method (*1) and plating deposition able to achieve amorphous volume percentage of 50% or more
VGVG: With A, over 30 g/m², with B, over 45 g/m², and with C, over 80 g/m²
VG: With A, 25 to 30 g/m², with B, 35 to 45 g/m², and with C, 60 to 80 g/m²
G: With A, 25 g/m² or less, with B, 35 g/m² or less, and with C, 60 g/m² or less
P: Amorphous volume percentage of 50% or less even under G conditions As shown in Table 4 and Table 5 (continuation of Table 4), the steel material of the present invention is superior in corrosion resistance and maintains sufficient performance in terms of plating adhesion, workability, dross formation, etc. In particular, the steel material of the present invention containing Mg in 1 to 55 mass %, Ca in 1 to 45 mass %, and Al in 0.07 to 45 mass % is further superior in terms of plating adhesion and workability. Among these, a material containing Mg in 1 to 25 mass %, Ca in 1 to 10 mass %, and Al in 0.07 to 25 mass % is further superior in corrosion resistance. Alternatively, a material specifying the Mg as 25 to 60 mass %, in particular 34 to 55 mass %, and containing Ca in 1 to 10 mass % and Al in 0.07 to 25 mass % exhibited similar corrosion resistance in the steel materials of the present invention, but was particularly high in ability to form an amorphous structure and enabled production of plated steel material of a large deposition (with a good efficiency by an inexpensive cooling apparatus. Further, a material containing one or more elements selected from Cr, Mn, Fe, Co, Ni, and Cu was particularly improved in adhesion, while a material containing one or more elements selected from La, Sn, and P was particularly improved in workability. Further, a material containing one or more elements selected from Bi, Mo, W, Si, Ti, V, Ag, and Y was improved in both of adhesion and ability to form an amorphous structure.

The comparative steel material not in the range of components of the plated steel material of the present invention or with a small amorphous volume percentage was insufficient in corrosion resistance or even if good in corrosion resistance, was insufficient in workability.

INDUSTRIAL APPLICABILITY

The high corrosion resistance hot dip galvanized steel material of the present invention can be produced by a conventional hot dip plating process and is both high in corrosion resistance and superior in sacrificial protection property. In addition, the steel material having an amorphous phase of the present invention is superior in corrosion resistance and workability compared with crystalline hot dip plating. This can be widely applied to automobiles, buildings and housing, and the like and improves the lifetime of members and greatly contributes to effective utilization of resources, reduction of the environmental load, and decrease of labor and costs of maintenance while maintaining a production ability similar to the past.

The invention claimed is:

1. A high corrosion resistance hot dip galvanized steel sheet characterized by having an alloy plated layer containing Zn in an amount of 35 to 65.8 mass % and Mg in an amount of 28 to 60 mass %, wherein said alloy plated layer contains a non-equilibrium phase with a heat capacity by differential scanning calorimetry of 1 J/g or more.

2. A high corrosion resistance hot dip galvanized steel sheet characterized by having an alloy plated layer comprising Zn in an amount of 35 to 65.8 mass % and Mg in an amount of 28 to 60 mass %, wherein said alloy plated layer contains a non-equilibrium phase having a heat capacity of 1 J/g or more by differential scanning calorimetry with a rate of temperature rise of 0.5° C./sec.

3. A high corrosion resistance hot dip galvanized steel sheet according to claim 1 wherein said Zn is 40 to 65.8 mass %.

4. A high corrosion resistance hot dip galvanized steel sheet according to claim 1 wherein said alloy plated layer contains, by mass %, Al: 0.07 to 27%.

5. A high corrosion resistance hot dip galvanized steel sheet according to claim 4 wherein said alloy plated layer contains, by mass %, Zn: 40 to 65.8%, and Mg: 28 to 45%.

6. A high corrosion resistance hot dip galvanized steel sheet according to claim 1 further containing as components in said alloy plated layer, by mass %, one or more elements selected from among Cr, Mn, Fe, Co, Ni, and Cu in a total of 0.1 to 10%.

7. A high corrosion resistance hot dip galvanized steel sheet according to claim 1 further containing as components in said alloy plated layer, by mass %, one or more elements selected from Bi, Mo, W, and Y in a total of 0.1 to 10%.

8. A high corrosion resistance hot dip galvanized steel sheet according to claim 1 further containing in said alloy plated layer, by mass %, one or more of La: 0.1 to 10%, Ce: 0.1 to 10%, Ca: 0.1% to 10%, Sn: 0.1% to 10%, P: 0.005% to 2%, and Si: 0.02% to 7%.

9. A high corrosion resistance hot dip galvanized steel sheet comprising having an alloy plated layer containing Zn in an amount of 35 mass % or more and Mg in an amount of 22 to 60 mass %, wherein said alloy plated layer contains a non-equilibrium phase with a heat capacity by differential scanning calorimetry of 1 J/g or more, and said alloy plated layer contains an amorphous phase in a vol % of 5% or more.

10. A high corrosion resistance hot dip galvanized steel sheet according to claim 9 wherein said alloy plated layer contains Al and Mg and the contents of Zn, Al, and Mg satisfy the relationships of the following (Formula 6) to (Formula 8):

$$35 \leq Zn\% \leq 75 \quad \text{(Formula 6)}$$

$$0.08 \leq Al\% \leq 25 \quad \text{(Formula 7)}$$

$$22 \leq Mg\% \leq 60 \quad \text{(Formula 8)}$$

(wherein the element name % is the content by mass % of the element).

11. A high corrosion resistance hot dip galvanized steel sheet according to claim 9 wherein said alloy plated layer contains, by mass %, one or more of Ca, Y, and La in a total of 0.1 to 10%.

12. A high corrosion resistance hot dip galvanized steel sheet according to claim 9 wherein a content of Al in said alloy plated layer is 14 mass % or less.

13. A high corrosion resistance hot dip galvanized steel sheet comprising having an alloy plated layer containing Zn in an amount of 35 mass % or more and Mg in an amount of 22 to 60 mass %, wherein said alloy plated layer contains a non-equilibrium phase with a heat capacity by differential scanning calorimetry of 1 J/g or more, and 50% or more in vol % in said alloy plated layer is an amorphous phase.

14. A high corrosion resistance hot dip galvanized steel sheet according to claim 13 wherein said alloy plated layer contains, by mass %, Zn: 35 to 60%, Mg: 25 to 60%, Ca: 1 to 10%, and Al: 0.07 to 25% and has a balance of unavoidable impurities.

15. A high corrosion resistance hot dip galvanized steel sheet characterized by having an alloy plated layer containing Zn in an amount of 40 mass % or more and Mg in an amount of 22 to 60 mass %, wherein 50% or more in vol % in said alloy plated layer is an amorphous phase.

16. A high corrosion resistance hot dip galvanized steel sheet according to claim 15 wherein said alloy plated layer contains, by mass %, Mg: 22 to 55%, Ca: 1 to 28%, and Al: 0.07 to 11%, and has a balance of unavoidable impurities.

17. A high corrosion resistance hot dip galvanized steel sheet according to claim 15 wherein said alloy plated layer contains, by mass %, Ca: 1 to 10%, and Al: 0.07 to 25%, has a total of contents of Mg and Ca of 5% or more, and has a balance of unavoidable impurities.

18. A high corrosion resistance hot dip galvanized steel sheet according to claim 15 wherein said alloy plated layer contains, by mass %, Zn: 40 to 60%, Mg: 34 to 55%, Ca: 1 to 10%, and Al: 0.07 to 25% and has a balance of unavoidable impurities.

19. A high corrosion resistance hot dip galvanized steel sheet according to claim 13 further containing as components in said alloy plated layer one or more elements selected from Cr, Mn, Fe, Co, Ni, and Cu in a total of 0.1 to 10 mass %.

20. A high corrosion resistance hot dip galvanized steel sheet according to claim 13 further containing as components in said alloy plated layer one or more elements selected from Bi, Mo, W, Si, Ti, V, Ag, and Y in a total of 0.1 to 10 mass %.

21. A high corrosion resistance hot dip galvanized steel sheet according to claim 13 further containing, by mass %, as components in said alloy plated layer one or more elements selected from La: 0.1 to 10%, Sn: 0.1 to 10%, and P: 0.005 to 2%.

22. A high corrosion resistance hot dip galvanized steel sheet according to claim 1 containing said alloy plated layer at least at part of the surface of the steel sheet.

23. A high corrosion resistance hot dip galvanized steel sheet characterized by having an alloy plated layer containing Zn in an amount of 35 to 65.8 mass % and Mg in an amount of 28 to 60 mass %, wherein said alloy plated layer contains a non-equilibrium phase with a heat capacity by differential scanning calorimetry of 1 J/g or more and in that 50% or more in vol % in said alloy plated layer is an amorphous phase.

* * * * *

UNITED STATES PATENT AND TRADEMARK OFFICE
CERTIFICATE OF CORRECTION

| | | |
|---|---|---|
| PATENT NO. | : 8,663,818 B2 | Page 1 of 1 |
| APPLICATION NO. | : 12/224967 | |
| DATED | : March 4, 2014 | |
| INVENTOR(S) | : Koichi Nose et al. | |

It is certified that error appears in the above-identified patent and that said Letters Patent is hereby corrected as shown below:

In the Specification

Column 3, line 45, change "an Mg-based" to -- a Mg-based --;

Column 13, line 7, change "a plated (steel" to -- a plated steel --;

Column 13, line 26, change "the effect to hard" to -- the effect is hard --;

Column 14, line 36, change "a underlying" to -- an underlying --;

Column 15, line 1, change "of an alloy of an alloy composition" to -- of an alloy composition --;

Table 3, column 21, change header "Platin composition [mass%]" to -- Plating composition [mass%] --;

Column 27, line 48, change "(with a good" to -- with a good --.

Signed and Sealed this
Twenty-third Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,663,818 B2                                             Page 1 of 1
APPLICATION NO.   : 12/224967
DATED             : March 4, 2014
INVENTOR(S)       : Nose et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1043 days.

Signed and Sealed this

Twenty-ninth Day of September, 2015

Michelle K. Lee
*Director of the United States Patent and Trademark Office*